(12) United States Patent
Frączek et al.

(10) Patent No.: US 10,732,817 B2
(45) Date of Patent: Aug. 4, 2020

(54) ELECTRONIC APPARATUS AND TEXT INPUT METHOD FOR THE SAME

(71) Applicant: Samsung Electronics Co., Ltd., Suwon-si, Gyeonggi-do (KR)

(72) Inventors: Roman Frączek, Warsaw (PL); Wojciech Rosloniec, Warsaw (PL); Marcin Michal Ziólek, Warsaw (PL); Marek Chmielowski, Izabelin (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 15/093,133

(22) Filed: Apr. 7, 2016

(65) Prior Publication Data

US 2017/0038939 A1    Feb. 9, 2017

(30) Foreign Application Priority Data

Aug. 5, 2015  (KR) .................. 10-2015-0110692

(51) Int. Cl.
*G06F 3/0488* (2013.01)
*G06F 1/16* (2006.01)
*G06F 3/0484* (2013.01)
*G06F 3/023* (2006.01)

(52) U.S. Cl.
CPC ............ *G06F 3/0488* (2013.01); *G06F 1/163* (2013.01); *G06F 3/0233* (2013.01); *G06F 3/0236* (2013.01); *G06F 3/04845* (2013.01); *G06F 3/04883* (2013.01)

(58) Field of Classification Search
CPC .... G06F 1/163; G06F 3/04845; G06F 3/0488; G06F 3/04883; G06F 3/017; G06F 3/0233; G06F 3/0236
See application file for complete search history.

(56) References Cited

U.S. PATENT DOCUMENTS

| | | | |
|---|---|---|---|
| 6,011,542 | A | 1/2000 | Durrani et al. |
| 6,556,222 | B1 | 4/2003 | Narayanaswami |
| 8,151,209 | B2 | 4/2012 | Law et al. |
| 8,479,122 | B2 | 7/2013 | Hotelling et al. |
| 2002/0122031 | A1 | 9/2002 | Maglio et al. |
| 2003/0001816 | A1 | 1/2003 | Badarneh |

(Continued)

FOREIGN PATENT DOCUMENTS

| | | |
|---|---|---|
| JP | 2003-515833 A | 5/2003 |
| JP | 2007-272905 A | 10/2007 |

(Continued)

OTHER PUBLICATIONS

European Examination Report dated Dec. 11, 2018, issued in European Application No. 16164020.6.

(Continued)

*Primary Examiner* — Tan H Tran
(74) *Attorney, Agent, or Firm* — Jefferson IP Law, LLP

(57) ABSTRACT

An electronic apparatus is provided. The electronic apparatus includes a display configured to display a text input image, a detector configured to detect a touch, and a controller configured to control the display to change a character displayed on the text input image to a different character in response to a touch drag being detected by the detector, wherein a speed of changing the character is differently adjusted according to a characteristic of the touch drag.

16 Claims, 27 Drawing Sheets

(56) References Cited

U.S. PATENT DOCUMENTS

| | | |
|---|---|---|
| 2007/0229473 A1 | 10/2007 | Kim et al. |
| 2008/0024444 A1* | 1/2008 | Abe ............... G06F 3/0485 345/157 |
| 2009/0322692 A1* | 12/2009 | Kim ............... G06F 3/0236 345/173 |
| 2010/0090968 A1 | 4/2010 | Lee et al. |
| 2010/0182264 A1 | 7/2010 | Hahn et al. |
| 2011/0037775 A1 | 2/2011 | Park et al. |
| 2011/0219302 A1 | 9/2011 | Kondo et al. |
| 2012/0229410 A1* | 9/2012 | Ohashi ............... G06F 3/04883 345/173 |
| 2013/0076669 A1 | 3/2013 | Ando |
| 2013/0080976 A1 | 3/2013 | Zambrano et al. |
| 2013/0241838 A1* | 9/2013 | Onishi ............... G06F 3/0236 345/169 |
| 2014/0351760 A1* | 11/2014 | Skory ............... G06F 3/0485 715/830 |
| 2015/0089435 A1 | 3/2015 | Kuzmin |
| 2015/0113398 A1 | 4/2015 | Kim |
| 2015/0160856 A1* | 6/2015 | Jang ............... G06F 3/04886 715/773 |
| 2015/0212683 A1 | 7/2015 | Arita et al. |
| 2016/0188184 A1* | 6/2016 | Garcia, Jr. ............... G06F 3/04847 715/780 |

FOREIGN PATENT DOCUMENTS

| | | |
|---|---|---|
| JP | 2013-073383 A | 4/2013 |
| KR | 10-2008-0033707 A | 4/2008 |
| KR | 10-2011-0018075 A | 2/2011 |
| KR | 10-2012-0097836 A | 9/2012 |
| WO | 2009/157637 A1 | 12/2009 |
| WO | 2011/151501 A1 | 12/2011 |
| WO | 2014/019085 A1 | 2/2014 |
| WO | 2014/189625 A1 | 11/2014 |

OTHER PUBLICATIONS

European Office Action dated Mar. 5, 2020 issued in European Application No. 16164020.6.

* cited by examiner

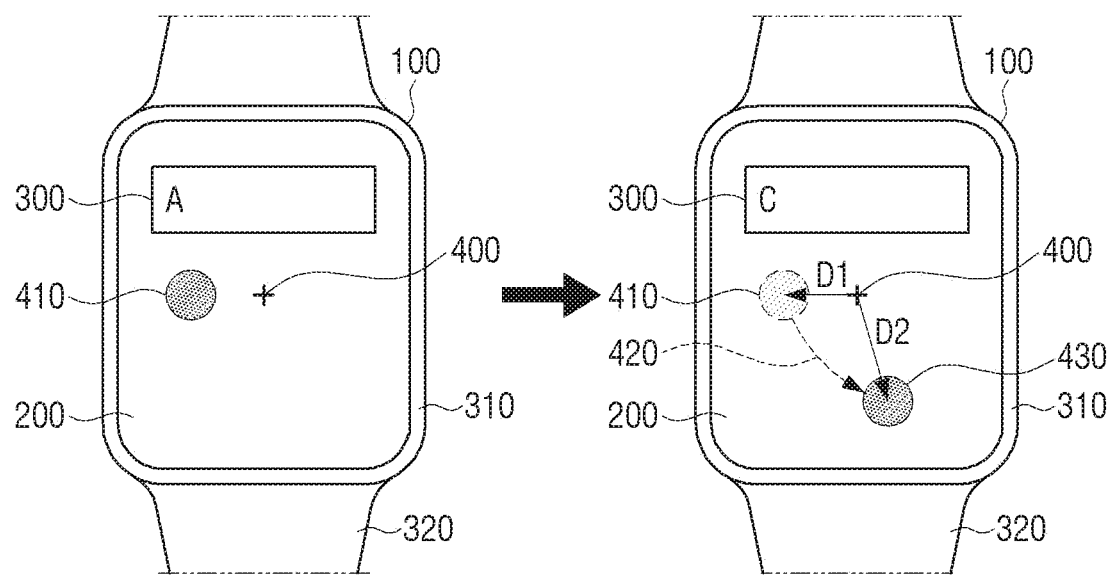

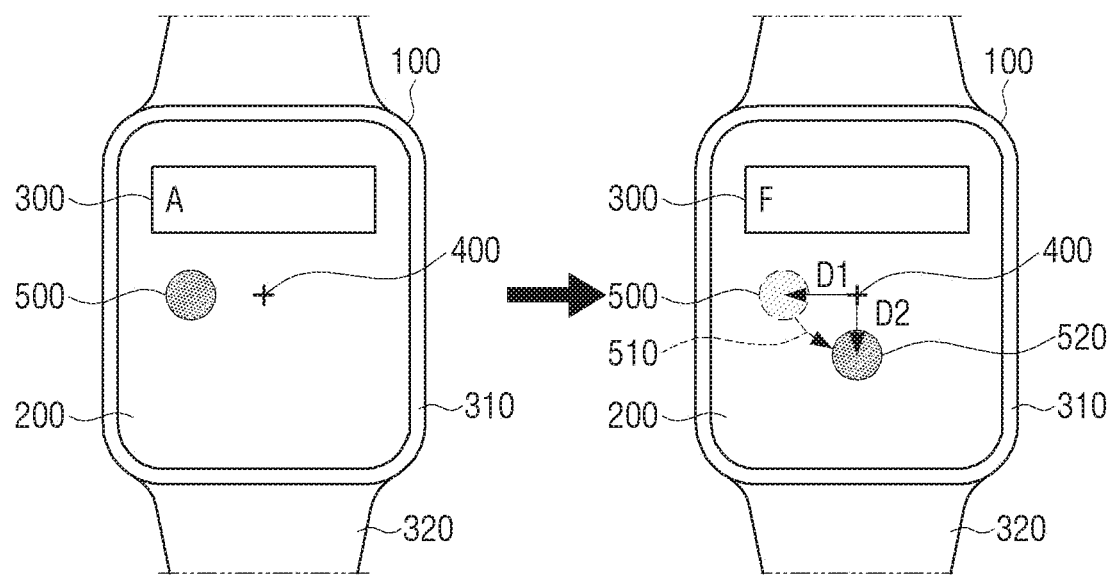

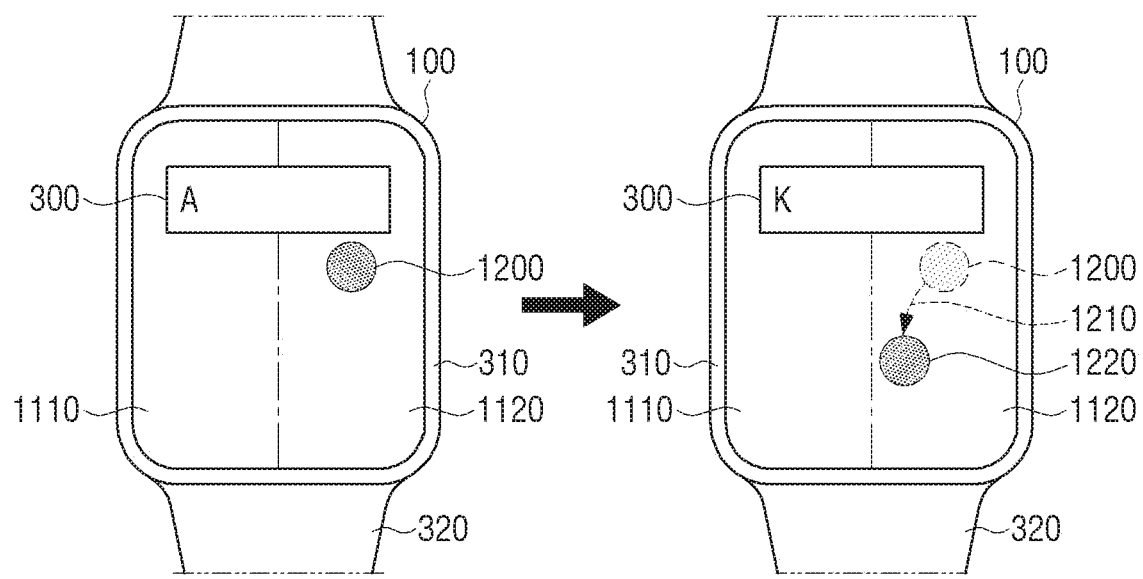

ELECTRONIC APPARATUS AND TEXT INPUT METHOD FOR THE SAME

CROSS-REFERENCE TO RELATED APPLICATION(S)

This application claims the benefit under 35 U.S.C. § 119(a) of a Korean patent application filed on Aug. 5, 2015 in the Korean Intellectual Property Office and assigned Serial number 10-2015-0110692, the entire disclosure of which is hereby incorporated by reference.

TECHNICAL FIELD

The present disclosure relates to an electronic apparatus and a text input method thereof, for text input. More particularly, the present disclosure relates to an electronic apparatus and a text input method thereof, for text input according to a user gesture.

BACKGROUND

In accordance with increasing trends, a web page is viewed or a text is input to a social network service (SNS) using an electronic apparatus including a display installed therein. There are very many methods of inputting a text to an electronic apparatus. A QWERTY keyboard or a text input keyboard available by an electronic apparatus manufacturer may be used. In addition, various text input applications associated with keyboards may be downloaded from a server and used.

Among types of electronic apparatuses, the number of types of apparatuses that are used while being wearable on a user body has increased. Examples of the wearable apparatuses may include a smart watch and a head mounted display (HMD). According to the characteristic of the electronic apparatuses of being used while being integrated with a human body, the size of the electronic apparatus has been miniaturized and, accordingly, the size of a portion to which a user touch is input has been gradually reduced. According to the characteristic of the miniaturized touch input portion, there is a need for technologies for conveniently and accurately input or changing a text by a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus and a text input method thereof.

In accordance with an aspect of the present disclosure, an electronic apparatus is provided. The electronic apparatus includes a display configured to display a text input image, a detector configured to detect a touch, and a controller configured to control the display to change a character displayed on the text input image to a different character in response to a touch drag being detected by the detector, wherein a speed of changing the character is differently adjusted according to a characteristic of the touch drag.

The controller may be configured to differently adjust the speed of changing the character based on a distance between a position in which the touch drag occurs and a predetermined point.

The predetermined point may be a central point of the display.

The controller may be configured to reduce the speed of changing the character when the touch drag is performed in a direction away from the central point of the display, and increase the speed of changing the character when the touch drag is performed in a direction toward the central point of the display.

The controller may be configured to differently adjust the speed of changing the character according to a change in a curvature of a trajectory of the touch drag.

The controller may be configured to divide an entire detection region of the detector into a plurality of detection regions, differentiate and detect the touch drag performed in each region, and differently adjust the speed of changing the character according to the differentiated touch drag.

The controller may be configured to increase the speed of changing the character when the touch drag is performed in a short distance area from the central point of the display, and reduce the speed of changing the character when the touch drag is performed in a distant distance area from the central point of the display.

The controller may be configured to select the character displayed on the text input image when a position of the touch drag is maintained for a predetermined time period.

The controller may be configured to select the character displayed on the text input image when the character displayed on the text input image according to the touch drag and then a progress direction of the touch drag is changed to a direction of the predetermined point.

The controller may be configured to select the character displayed on the text input image when the character displayed on the text input image is changed according to the touch drag and then a different touch is separately input from the touch drag.

The controller may be configured to control the display to display a character on the text input image in response to a touch being detected by the detector, to sequentially change the character to a different character in a first order when the touch drag is performed in a first direction based on a point in which the touch is detected, and to sequentially change the character to a different character in a second order when the touch drag is performed in a second direction.

The electronic apparatus may further include band portions connected to opposite sides of the display so as to be wearable on a user body, wherein the display and the detector may constitute a touchscreen.

The detector may be an independent touch pad separated from the display.

In accordance with another aspect of the present disclosure, an electronic apparatus is provided. The electronic apparatus includes a display configured to display an item, a detector configured to detect a touch, and a controller configured to control the display to change an item displayed on the display to a different item in response to a touch drag being detected by the detector, wherein the controller may be configured to select the changed item in response to a preset user manipulation being input while the item is changed.

In accordance with another aspect of the present disclosure, a method for inputting a text of an electronic apparatus is provided. The method includes displaying a text input image on a display, and changing a character displayed on the text input image to a different character in response to a touch drag being detected, wherein a speed of changing the character is differently adjusted according to a characteristic of the touch drag.

The speed of changing the character may be differently adjusted based on a distance between a position in which the touch drag occurs and a predetermined point.

The predetermined point may be a central point of the display.

The method may further include reducing the speed of changing the character when the touch drag is performed in a direction away from the central point of the display, and increasing the speed of changing the character when the touch drag is performed in a direction toward the central point of the display.

The method may further include differently adjusting the speed of changing the character according to change in a curvature of a trajectory of the touch drag.

The method may further include dividing an entire detection region of the detector into a plurality of detection regions and differently adjusting the speed of changing the character according to the touch drag differentiated for the respective regions.

In accordance with another aspect of the present disclosure, a non-transitory computer readable medium for storing a program for execution, by at least one processor of an electronic apparatus, a text input method is provided. The text input method includes displaying a text input image, and changing a character displayed on the text input image to a different character in response to a touch drag being detected, wherein a speed of changing the character is differently adjusted according to a characteristic of the touch drag.

According to various embodiments of the present disclosure, a user may conveniently input a character using a gesture of touching and dragging an electronic apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A to 5B are diagrams for explanation in which character change speed is changed according to the characteristic of touch drag according to various embodiments of the present disclosure;

FIGS. 11A to 12B are diagrams illustrating a case in which speed of changing a character is differently adjusted according to a region to which touch drag is input according to various embodiments of the present disclosure;

Throughout the drawings, like reference numerals will be understood to refer to like parts, components, and structures.

DETAILED DESCRIPTION

Figures 1A, 1B:
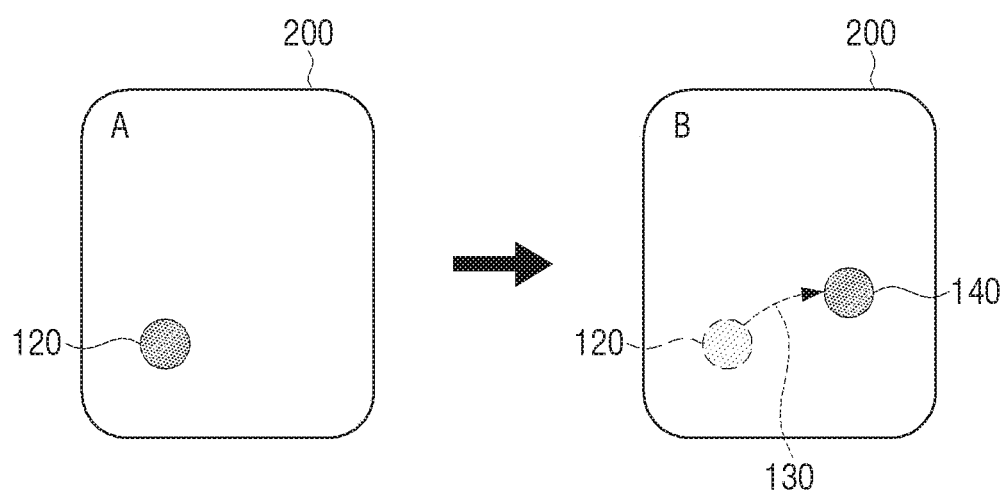
FIGS. 1A and 1B are diagrams for explanation of an operation of an electronic apparatus according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms such as "first" and "second" are used herein merely to describe a variety of constituent elements, but the constituent elements are not limited by the terms. The terms are used only for the purpose of distinguishing one constituent element from another constituent element.

Also, the terms such as "include" or "comprise" may be construed to denote a certain characteristic, number, operation, constituent element, or a combination thereof, but may not be construed to exclude the existence of or a possibility of addition of one or more other characteristics, numbers, operations, constituent elements, or combinations thereof.

Also, the terms, such as 'unit' or 'module', etc., should be understood as a unit that processes at least one function or operation and that may be embodied in a hardware manner, a software manner, or a combination of the hardware manner and the software manner. In addition, a plurality of 'modules' or a plurality of 'units' may be integrated into at least one module to be embodied as at least one processor (not shown) except for a 'module' or a 'unit' that needs to be embodied as a specific hardware.

In the specification, when it is described that a certain part is "connected" to another part, it should be understood that the certain part may be directly connected to another part or electrically connected to another part via another part in the middle. In addition, when a certain part "includes" a certain component, this indicates that the part may further include another component instead of excluding another component unless there is no different disclosure.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In various embodiments of the present disclosure, user input may include at least one of touch input, bending input, voice input, button input, motion input, and multimodal input, but is not limited thereto.

In various embodiments of the present disclosure, the "touch input" may include a touch gesture that is performed on a display and a cover in order to control an apparatus. In addition, the "touch input" may include touch (e.g., floating or hovering) in a state in which an object is spaced apart by a predetermined distance or more without contact on a display. The touch input may include, but is not limited to, a touch and hold gesture, a tap gesture of release after touch, a double tap gesture, a panning gesture, a flick gesture, a touch drag gesture of movement after touch, a pinch gesture, and so on.

In various embodiments of the present disclosure, the "button input" refers to input for controlling an apparatus using a physical button attached to an apparatus by a user.

In various embodiments of the present disclosure, the "motion input" refers to motion applied to an apparatus by a user for control of an apparatus. For example, the motion input may include rotation of an apparatus, tilt of the apparatus, or movement of the apparatus in an up, down, right or left direction by a user.

In various embodiments of the present disclosure, the "multimodal input" refers to a method formed by coupling at least two input methods. For example, an apparatus may receive touch input and motion input of a user or receive touch input and voice input of the user.

In various embodiments of the present disclosure, the "application" refers to a series of computer program sets invented for a specific work. In various embodiments of the present disclosure, the application may have various types. For example, the application may include, but is not limited to, a game application, a video reproducing application, a map application, a memo application, a calendar application, a phone book application, a broadcast application, a sport supporting application, a payment application, a picture folder application, a medical device control application, a user interface providing application of a plurality of medical devices, and so on.

In various embodiments of the present disclosure, the "application identification (ID) information" may be unique information for differentiating an application from a different application. For example, the application ID information may be, but is not limited to, an icon, an index item, link information, or the like.

In addition, in various embodiments of the present disclosure, a user interaction (UI) element refers to an element that is capable of interacting with a user and transmitting visual, audible, and olfactory feedback according to user input.

Various embodiments of the present disclosure will now be described in greater detail with reference to the accompanying drawings.

FIGS. 1A and 1B are diagrams for explanation of an operation of an electronic apparatus 100 according to various embodiments of the present disclosure. In detail, the case in which a text is input to the electronic apparatus 100 will be exemplified.

Referring to FIGS. 1A and 1B, the electronic apparatus 100 may be embodied as devices that have various purposes and include a display 200. For example, the electronic apparatus 100 may be embodied as, but is not limited to, a portable phone, a smart phone, a laptop computer, a tablet device, an electronic book device, a digital broadcast device, personal digital assistants (PDA), a portable multimedia player (PMP), a navigation device, or a wearable device such as a smart watch, smart glasses, or a head mounted display (HMD).

In the embodiment of FIGS. 1A and 1B, the electronic apparatus 100 may conveniently select and input a text according to the characteristic of touch drag of a user. The characteristic of the touch drag may include a trajectory shape, a trajectory curvature, a position, a moving distance, a direction, speed, a change in distance to a touched point from a specific point, and so on.

Referring to FIG. 1A, the electronic apparatus 100 may include the display 200. The display 200 may be a touchscreen for detection of a touch input. In response to a touch on the display 200 being detected, one item may be displayed in one region of the display 200. An item refers to a separable and independent object. In detail, the item may include picture content, video content, a graphic image, a web site, an icon, an application execution image, and so on as well as a text such as a word, a number, and a sign.

FIGS. 1A and 1B illustrates alphabetic characters as an example of the item. In response to a touch being detected, the electronic apparatus 100 may display an arbitrary character "A" in one region of the display 200.

Referring to FIG. 1B, a controller 210 may detect an operation of a touch drag 130 of movement to a point of a touch 2 140 from a point of a touch 1120. A trajectory of the touch drag 130 may be arbitrarily formed by a user. Although FIG. 1B illustrates the touch drag 130 that forms a curved trajectory, the embodiment of the present disclosure is not limited thereto. In response to the touch drag 130 occurring, the electronic apparatus 100 may change a character or item "A" displayed in one region of the display 200 to a next character "B" and display "B". In response to the touch drag 130 continuously occurring while "B" is displayed, the electronic apparatus 100 may display a next character "C".

As described above, the electronic apparatus 100 may sequentially change an item display on the display 200 using the display 200 for detection of a touch and so on.

In addition, the electronic apparatus 100 may distinguish the characteristics of touch drag and may differently adjust speed of changing a character or item displayed on the display 200 into a different character or item. Accordingly, a character or an item may also be effectively changed on a touchscreen with a limited size, for detection of touch input, and so on.

Figure 2:
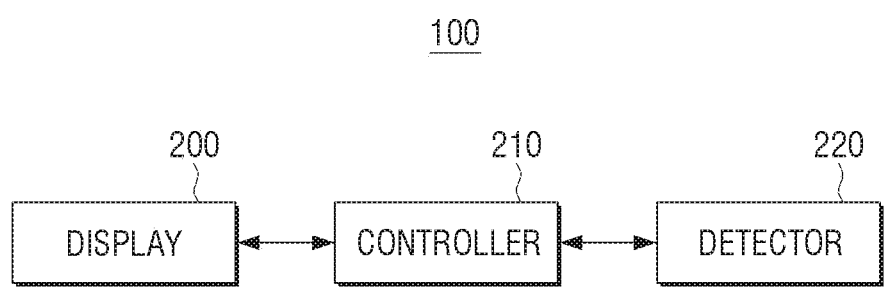
FIG. 2 is a schematic block diagram illustrating a configuration of an electronic apparatus according to an embodiment of the present disclosure.

FIG. 2 is a schematic block diagram illustrating a configuration of the electronic apparatus 100 according to an embodiment of the present disclosure.

Referring to FIG. 2, the electronic apparatus 100 may include the display 200, the controller 210, and a detector 220.

The display 200 may provide a display region for displaying a character or an item. That is, the display region of the display 200 may be divided into a plurality of regions, and a character or an item may be displayed in one region. The character or item displayed on the display 200 may be displayed by a manufacturer of the electronic apparatus 100, a provider of an application installed in the electronic apparatus 100, a provider of an operating system, or the like. Alternatively, the item displayed on the display 200 may be displayed by a user through a user interface. As described above, items may be distinguished in various types. For example, when the display 200 displays a character input image, an item may be embodied as a character displayed in the character input image.

The detector 220 may be a component for detection of a touch. The detector 220 may detect a user touch using a touch sensor. In addition, the detector 220 may convert intensity of the touch, the length of the touch, movement of the touch, or the like into a value and transmit the value to the controller 210. The detector 220 may be embodied as a touchpad that is separately provided from the display 200 or embodied as a touchscreen integrated with the display 200.

The controller 210 may be a component for control of an operation of the electronic apparatus 100. The controller 210 may control the display 200 to change and display an item displayed in a partial region of the display region based on various touch inputs. The controller 210 may determine an item to be changed and displayed based on various touch input values received from the detector 220 and transmit a voltage control signal corresponding to the determined item to the display 200. The display 200 may change a character or item displayed in one region of the display 200 into a different character or item and display the different character or item according to the received voltage control signal.

As described above, in response to arbitrary touch drag being detected by the detector 220 while the display 200 displays a text input image, the controller 210 may control the display 200 to change a character displayed on the character input image into a different character. In this case, character changing speed may be differently adjusted according to the character of the touch drag. An operation of the electronic apparatus 100 will be described below in detail together with various diagrams.

Figure 3A:
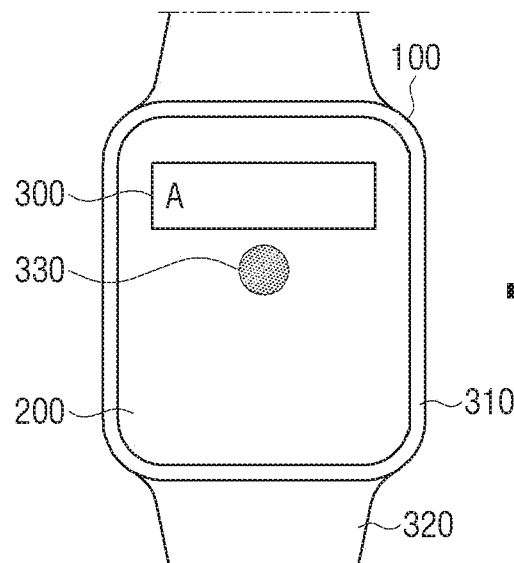
FIGS. 3A to 3C are diagrams illustrating a case in which an electronic apparatus changes and displays a character or an item according to various embodiments of the present disclosure.
Figure 3B:
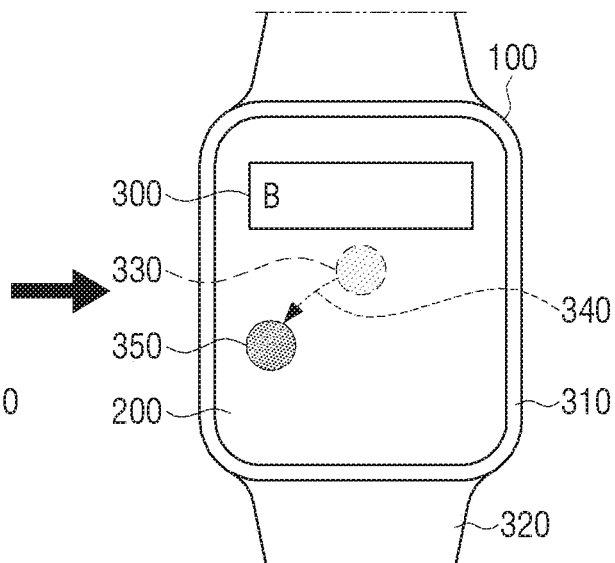
Figure 3C:
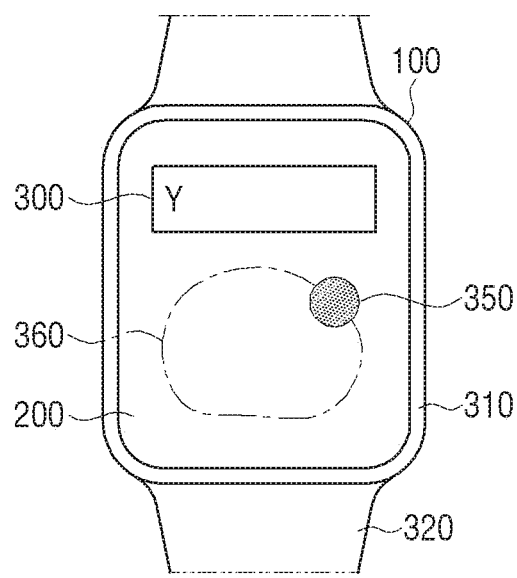

FIGS. 3A to 3C are diagrams illustrating a case in which the electronic apparatus 100 changes and displays a character or an item according to various embodiments of the present disclosure. As described above, the electronic apparatus 100 may be embodied in various forms. In the specification, for convenience, a wearable device that is wearable on a human body of the user is used, but the embodiment of the present disclosure is not limited thereto.

Referring to FIG. 3A, the electronic apparatus 100 may include the display 200. The display 200 may be generally configured with a flat surface but, as necessary, may be configured with a bent shape or a curved shape. The display 200 may be configured in the form of a touchscreen integrated with the detector 220. Bezels 310 are disposed at four lateral sides of the display 200 to protect the display 200 from external shock. Bands 320 may be connected to one end of the display 200 and the other end opposite thereto. The user may attach the electronic apparatus 100 to a part of a human body using the bands 320.

The controller 210 may control the display 200 to display the text input image thereon. Although FIGS. 3A to 3C illustrate the case in which the text input image is displayed in the form of a text input window 300, the embodiment of the present disclosure is not limited thereto. The user may input a text to a web page or a social network service (SNS) displayed on the display 200 using the text input window 300. The detector 220 may detect a touch 1 330 that occurs in one region of the display 200. The controller 210 may display a character "A" on the text input window 300 based on the detected touch 1 330.

FIG. 3B is a diagram illustrating a case in which touch drag is generated by user input.

The detector 220 may detect movement of the touch 1 330 to a position of a touch 2 350 through an operation of touch drag 340. The controller 210 may change a character "A"

displayed on the text input window 300 into a character "B" and display the character "B" based on the detected operation of the touch drag 340.

FIG. 3C is a diagram illustrating a case in which touch drag continuously occurs according to user input.

The detector 220 may detect that the touch drag 340 continuously occurs and a trajectory 360 is formed in the display 200. The trajectory 360 may have an arbitrary shape by a user instead of a predetermined shape. The controller 210 may sequentially change a character displayed on the text input window 300 based on the touch drag that continuously occurs.

In detail, referring to FIG. 3C, when an English alphabet character is displayed on the text input window 300, the controller 210 may sequentially display characters on the text input window 300 from a character "A" to a character "Z" according to the touch drag 340 that continuously occurs.

An order of displaying characters may be changed according to a direction of touch drag. In detail, when the touch drag proceeds in a first direction, the controller 210 may display characters in a first order, that is, an order of "A", "B", . . . , "Z". In addition, when the touch drag proceeds in a second direction, the controller 210 may display characters in a second order, that is, an order of "Z", "Y", . . . , "A". For example, the first direction may be a clockwise direction or a screen right direction and the second direction may be a counterclockwise direction or a screen left direction, but the embodiment of the present disclosure is not limited thereto. That is, the first and second directions may be oppositely set.

In addition, although FIGS. 3A to 3C illustrate and describe that the controller 210 displays a reference character "A" in response to a touch being initially detected, the embodiment of the present disclosure is not limited thereto. That is, when a touch is initially detected and drag is performed while "A" is already displayed, the controller 210 may change an item in an order of "B, C, D, . . . " as next characters. Alternatively, when the controller 210 may not display anything in the presence of an initial touch and may begin to display a character in response to touch drag being performed by a predetermined distance or more.

Although FIGS. 3A to 3C illustrate the case in which a character "A" is initially displayed for convenience of description, the embodiment of the present disclosure is not limited thereto. That is, a reference item that is initially displayed may be set as a first item (e.g., "A" in the case of alphabet and "1" in the case of number), but the embodiment of the present disclosure is not limited thereto.

For example, when touch drag is performed in a counterclockwise direction or a left direction, the controller 210 may display an item from a last item (e.g., "Z" in the case of alphabet and "0" in the case of number). For convenience of description, in the following embodiments of the present disclosure, an item is an alphabet and is initially displayed from "A".

In response to a character to be input by a user during touch drag, the user may input arbitrary manipulation to select the displayed character. The manipulation for character selection may be embodied in various forms according to various embodiments of the present disclosure. For example, in response to manipulation, of releasing a touch state, stopping drag for a predetermined time period (e.g., 1 to 2 seconds), or remarkably changing touch drag in a specific direction, being detected, the controller 210 may determine the manipulation as intention for selection of a currently displayed character. Accordingly, the controller 210 may fix the selected character, display a character in a next position in the text input window 300, and change the corresponding character to another character according to subsequent touch drag of the user. A manipulation method for selecting a character by a user will be described in detail in other parts of the specification with reference to the accompanying drawings.

FIGS. 3A to 3C illustrate a procedure of sequentially changing a character to a different character, and in this regard, the change speed may also be differently changed according to the characteristic of touch drag.

FIGS. 4A to 5B are diagrams for explanation in which character change speed is changed according to the characteristic of touch drag according to various embodiments of the present disclosure.

Referring to FIG. 4A, the detector 220 may detect a touch 1 410 generated in one region of the display 200. The controller 210 may display a character "A" on the text input window 300 based on a signal of the detected touch 1 410.

Referring to FIG. 4B, the detector 220 may detect an operation of touch drag 420 of movement to a point of a touch 2 430 from a point of the touch 1 410. The controller 210 may sequentially change a character "A" displayed on the text input window 300 to a character "C" based on the signal of the detected touch drag 420.

In this case, the controller 210 may control speed of changing a character based on a central point 400 of the display 200, a point of the touch 1 410, and a distance between the central point 400 of the display 200 and a point of the touch 2 430.

In detail, a distance D1 between the central point 400 and the touch 1 410 may be greater than a distance D2 between the central point 400 and the touch 2 430. As such, when the touch drag 420 is performed in a direction away from the central point 400, the controller 210 may reduce the speed of changing a character compared with the case in which D1 and D2 are the same. Needless to say, in the aforementioned case, the controller 210 may increase the speed of changing a character.

Referring to FIG. 5A, the detector 220 may detect a touch 1 500 that occurs in one region of the display 200. The controller 210 may display a character "A" on the text input window 300 based on a signal of the detected touch 1 500.

Referring to FIG. 5B, the detector 220 may detect an operation of touch drag 510 of movement to a point of a touch 2 520 from a point of the touch 1 500. The controller 210 may sequentially change a character "A" displayed on the text input window 300 to a character "F" based on the signal of the detected touch drag 510.

In this case, the controller 210 may control speed of changing a character based on the central point 400 of the display 200, a point of the touch 1 500, and a distance between the central point 400 of the display 200 and a point of the touch 2 520.

In detail, a distance D1 between the central point 400 and the touch 1 500 may be greater than a distance D2 between the central point 400 and the touch 2 520. As such, when the touch drag 510 is performed in a direction toward the central point 400, the controller 210 may increase the speed of changing a character compared with the case in which D1 and D2 are the same. Needless to say, in the aforementioned case, the controller 210 may reduce the speed of changing a character.

Distances between the central point 400 and touched points may be calculated via various methods. For example, a distance between a central point and a touched point may be calculated via calculation of vector values.

Figure 6:
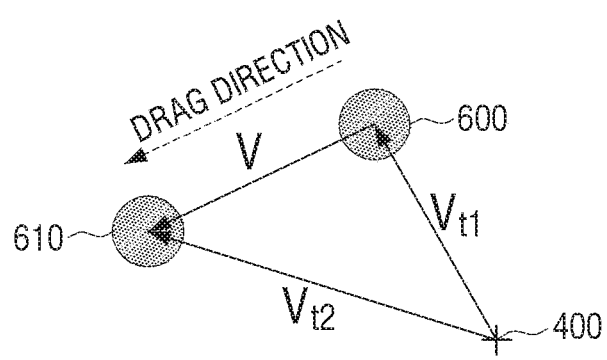
FIG. 6 is a diagram for explanation of an example of a method of calculating a distance between a central point and a touched point according to an embodiment of the present disclosure.

FIG. 6 is a diagram for explanation of an example of a method of calculating a distance between a central point and a touched point according to an embodiment of the present disclosure.

Referring to FIG. 6, when a distance to a touch 2 610 from the central point 400 is D, a vector value to a touch 1 600 from the central point 400 is |Vt1|, a vector value to the touch 2 610 from the central point 400 is |Vt2|, and a vector value toward the touch 2 610 from the touch 1 600 is |V|, the following formula is satisfied.

$$D=|V|*|Vt1|=|Vt1-Vt2|*|Vt1|$$

The controller 210 may calculate a distance from a currently touched point from the central point 400 using the above formula and may differently adjust speed of changing a character displayed on the text input window 300.

FIGS. 7A to 8C are diagrams for explanation in which character change speed is changed according to the characteristic of touch drag according to various embodiments of the present disclosure.

Figures 7A, 7B:
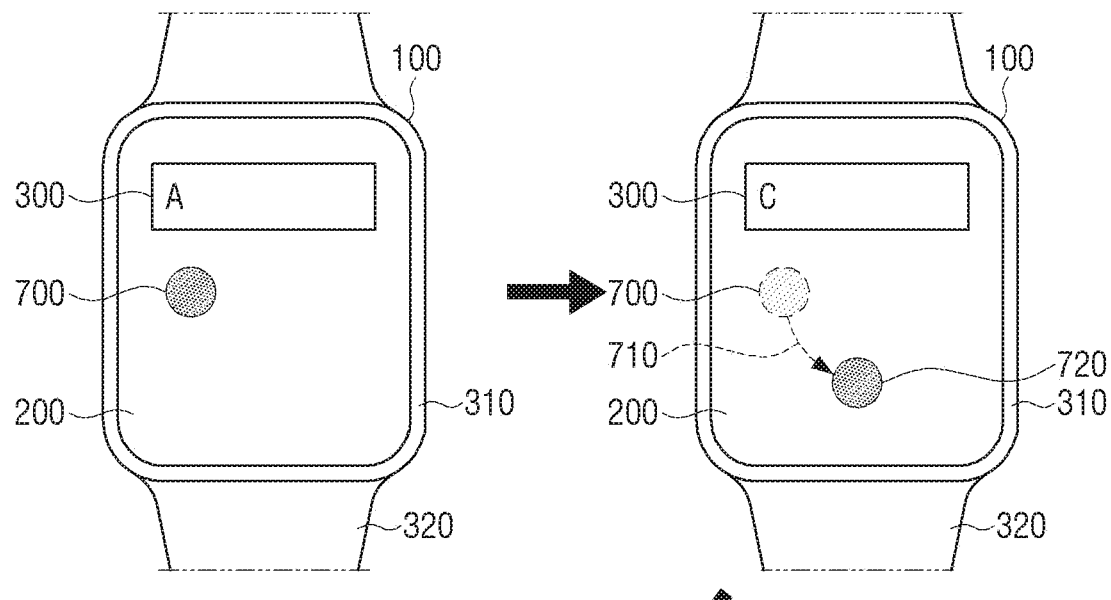
FIGS. 7A to 8C are diagrams for explanation in which character change speed is changed according to the characteristic of touch drag according to various embodiments of the present disclosure.

Referring to FIG. 7A, the detector 220 may detect a touch 1 700 that occurs in one region of the display 200. The controller 210 may display a character "A" on the text input window 300 based on a signal of the detected touch 1 700.

Referring to FIG. 7B, the detector 220 may detect touch drag 1 710 of movement to a point of a touch 2 720 from the point of the touch 1 700. The controller 210 may sequentially change a character "A" displayed on the text input window 300 to a character "C" based on a signal of the detected touch drag 1 710.

Figure 7C:
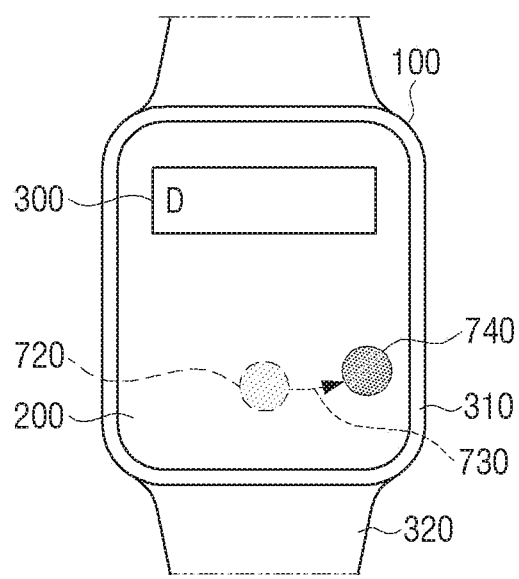

Referring to FIG. 7C, the detector 220 may detect touch drag 2 730 of movement to a point of a touch 3 740 from the point of the touch 2 720. The controller 210 may sequentially change a character "C" displayed on a text input window to a character "D" based on a signal of the detected touch drag 2 730. In this case, the controller 210 may control speed of changing a character based on a curvature of the touch drag 1 710 and a curvature of the touch drag 2 730.

In detail, when the touch drag 2 730 has a greater curvature than the touch drag 1 710, the controller 210 may control speed of changing a character by the touch drag 1 710 to be smaller than speed of changing a character by the touch drag 2 730.

As the speed is reduced, a character change number of times may be changed. That is, since the touch drag 2 730 and the touch drag 1 710 are moved by the same distance, the controller 210 needs to sequentially change a displayed character "C" to a character "E". However, since a curvature of the touch drag 2 730 is greater than a curvature of the touch drag 1 710, the controller 210 may sequentially change a character "C" to display up to a character "D". Needless to say, a relationship between a curvature and character change speed may be differently set. That is, in the above case, when a curvature is increased, the controller 210 may adjust character change speed to be greater.

Figure 8A:
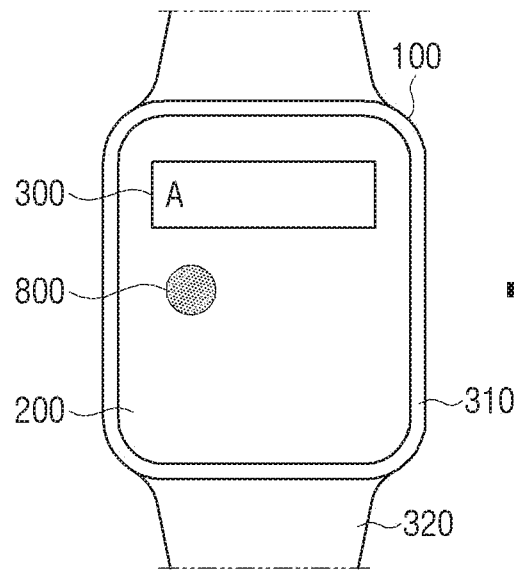

Referring to FIG. 8A, the detector 220 may detect a touch 1 800 that occurs in one region of the display 200. The controller 210 may display a character "A" on the text input window 300 based on a signal of the detected touch 1 800.

Figure 8B:
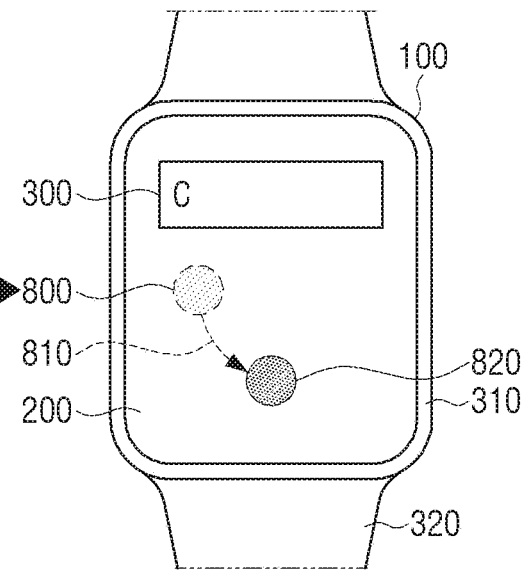

Referring to FIG. 8B, the detector 220 may detect touch drag 1 810 of movement to a point of a touch 2 820 from the point of the touch 1 800. The controller 210 may sequentially change a character "A" displayed on the text input window 300 to a character "C" based on a signal of the detected touch drag 1 810.

Figure 8C:
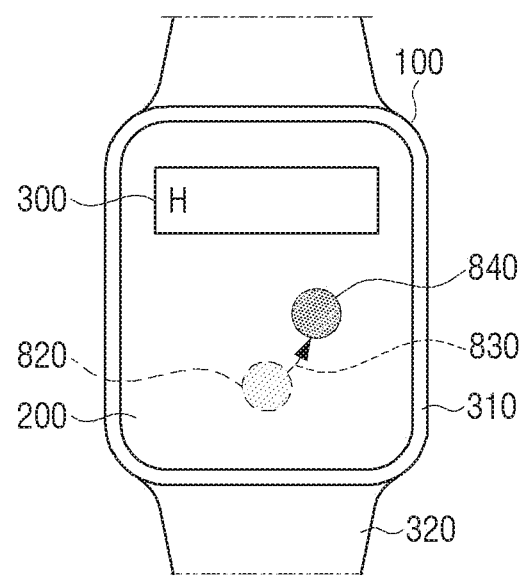

Referring to FIG. 8C, the detector 220 may detect touch drag 2 830 of movement to a point of a touch 3 840 from the point of the touch 2 820. The controller 210 may sequentially change a character "C" displayed on a text input window to a character "H" based on a signal of the detected touch drag 2 830. In this case, the controller 210 may control speed of changing a character based on a curvature of the touch drag 1 810 and a curvature of the touch drag 2 830.

In detail, since the touch drag 2 830 has a smaller curvature than the touch drag 1 810, the controller 210 may control speed of changing a character by the touch drag 2 830 to be greater than speed of changing a character by the touch drag 1 810.

That is, since the touch drag 2 830 and the touch drag 1 810 are moved by the same distance, the controller 210 needs to sequentially change a displayed character "C" to a character "E". However, since a curvature of the touch drag 2 830 is smaller than a curvature of the touch drag 1 810, the controller 210 may sequentially change a character "C" to display up to a character "H". Needless to say, a relationship between a curvature and character change speed may be differently set. That is, in the above case, when a curvature is reduced, the controller 210 may adjust character change speed to be smaller.

The electronic apparatus 100 may change a character in consideration of a moving distance of touch drag as well as a curvature of touch drag. For example, even if moving distances are different, when curvatures are the same, the controller 210 may sequentially display a character in the same way. However, in consideration of a moving distance of touch drag, even if curvatures are the same, the controller 210 may sequentially display more characters on the display 200 based on touch drag with a long moving distance.

The controller 210 may calculate a curvature of touch drag using various methods.

Figure 9A:
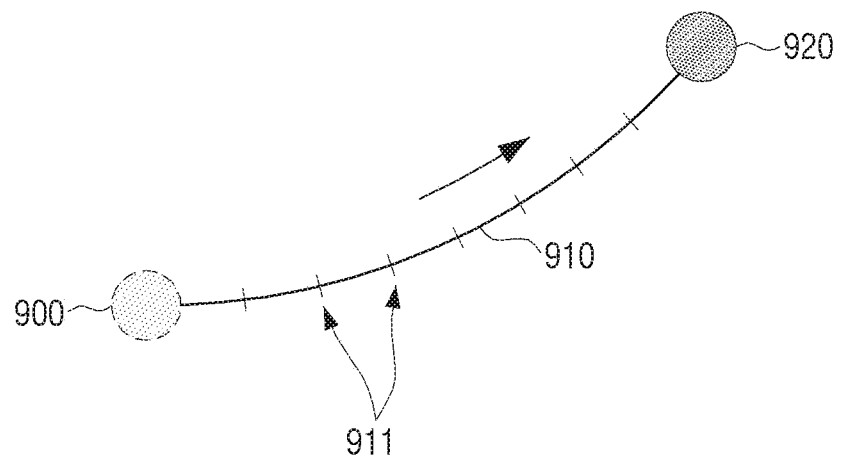
FIGS. 9A and 9B are diagrams illustrating calculation of a curvature of touch drag according to various embodiments of the present disclosure.
Figure 9B:
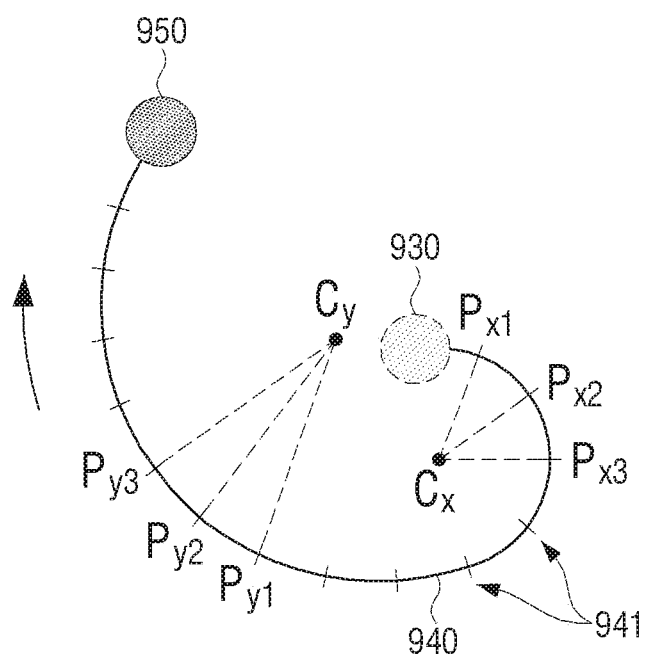

FIGS. 9A and 9B are diagrams illustrating calculation of a curvature of touch drag, according to various embodiments of the present disclosure.

Referring to FIG. 9A, the detector 220 may detect touch drag 1 910 of movement to a point of a touch 2 920 from a point of a touch 1 900. The controller 210 may set arbitrary points 911 on the touch drag 1 910 at a constant interval during the touch drag 1 910. The controller 210 may calculate a curvature at a corresponding point using consecutive points among the calculated arbitrary points 911.

In detail, referring to FIG. 9B, the detector 220 may detect touch drag 2 940 of movement to a touch 4 950 from a touch 3 930. The controller 210 may set arbitrary points 941 at a constant interval during the touch drag 2 940.

For example, Px1, Px2, and Px3 are arbitrary points 941 that are set at a constant interval. The controller 210 may set an intersection formed by connecting the three points Px1, Px2, and Px3 to lines perpendicular to a progress direction of the touch drag 2 940 as an imaginary central point Cx and may calculate a curvature of a trajectory of the touch drag 2 940 based on the set imaginary central point Cx.

Likewise, Py1, Py2, and Py3 are arbitrary points 941 that are set at a constant interval. The controller 210 may set an intersection formed by connecting the three points Py1, Py2, and Py3 to lines perpendicular to a progress direction of the touch drag 2 940 as an imaginary central point Cy and may calculate a curvature of a trajectory of the touch drag 2 940 based on the set imaginary central point Cy.

As a result, during the above touch drag 2 940, the controller 210 may compare a pre-calculated curvature and a currently calculated curvature while calculating a curvature of the touch drag 2 940 at a constant interval and may differently adjust change speed of a character displayed on a text input window.

The controller 210 may differently set an order of displaying characters according to a progress direction of touch drag.

Figure 10:
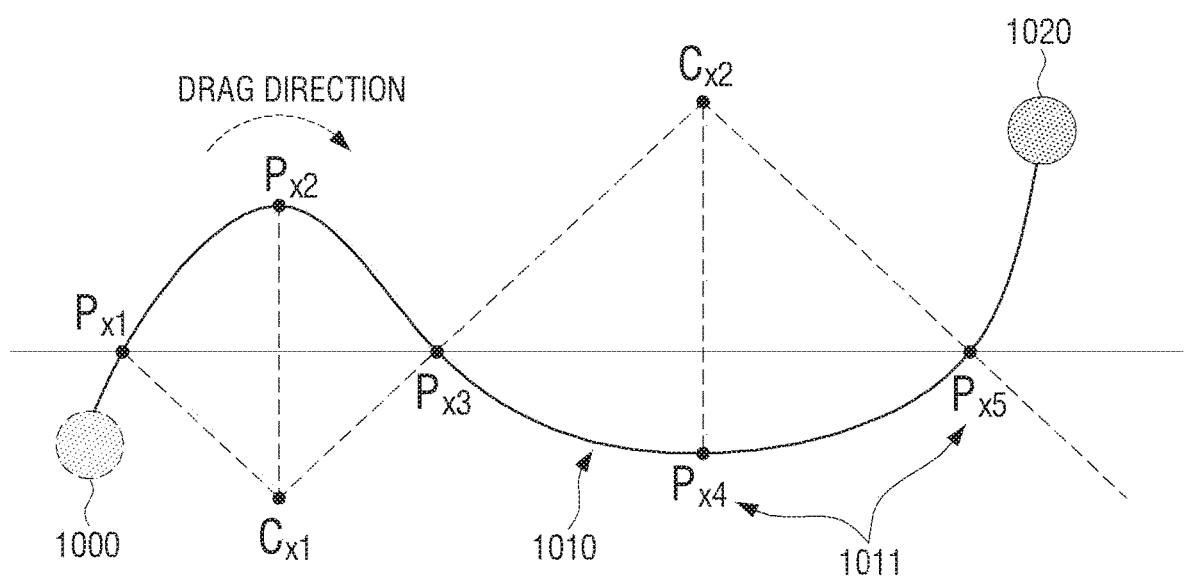
FIG. 10 is a diagram illustrating calculation of a progress direction of touch drag according to an embodiment of the present disclosure.

FIG. 10 is a diagram illustrating calculation of a progress direction of touch drag, according to an embodiment of the present disclosure.

Referring to FIG. 10, the detector 220 may detect touch drag 1010 of movement to a touch 2 1020 from a touch 1 1000. The controller 210 may set arbitrary points 1011 at a constant interval on a trajectory of the touch drag 1010 during the touch drag 1010. In addition, as described with reference to FIGS. 9A and 9B, the controller 210 may continuously calculate a curvature during the touch drag 1010.

In detail, when an imaginary line that connects arbitrary central points Cx1 and Cx2 set for calculation of a curvature crosses an imaginary line that connects arbitrary points Px1 and Px5, the controller 210 may derive that a direction of touch direction is changed.

FIGS. 11A to 12B are diagrams illustrating a case in which speed of changing a character displayed on the text input window 300 is differently adjusted according to the characteristic of touch drag according to various embodiments of the present disclosure.

Figures 11A, 11B:
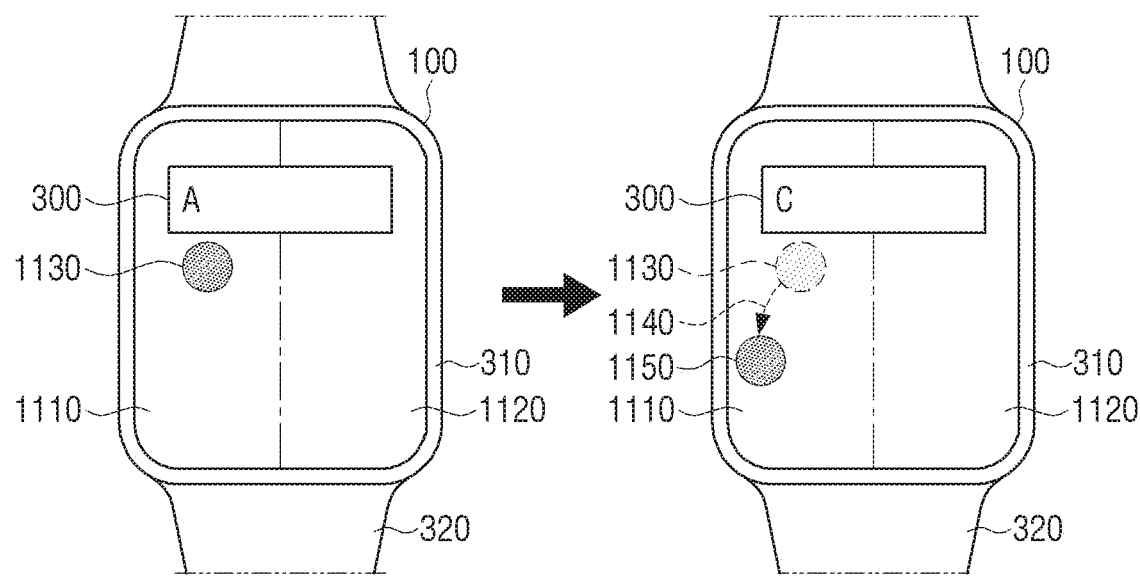

Referring to FIG. 11A, the detector 220 may divide a touch drag input of a user into a plurality of portions and detect the portions. For example, the detector 220 may differentiate and detect touch drag that occurs in a region A 1110 and touch drag that occurs in a region B 1120. The controller 210 may differently adjust the speed of changing the character displayed on the text input window 300 according to the touch drags that are differentiated and detected.

In detail, referring to FIG. 11A, the detector 220 may detect that a touch 1 1130 occurs in the region A 1110. The controller 210 may display a character "A" on the text input window 300 based on the touch 1 1130 in the region A 1110.

Referring to FIG. 11B, the detector 220 may detect that touch drag 1140 to a touch 2 1150 from the touch 1 1130 occurs in the region A 1110. The controller 210 may sequentially change the character "A" displayed on the text input window 300 to a character "C" based on a signal of the detected touch drag 1140.

Referring to FIG. 12A, the detector 220 may detect that a touch 1 1200 occurs in the region B 1120. The controller 210 may display a character "A" on the text input window 300 based on the touch 1 1200 in the region B 1120.

Referring to FIG. 12B, the detector 220 may detect that touch drag 1210 to a touch 2 1220 from the touch 1 1200 occurs in the region B 1120. The controller 210 may sequentially change the character "A" displayed on the text input window 300 to a character "K" based on a signal of the detected touch drag 1210.

As described above, the controller 210 may more rapidly change a character and display the changed character on the text input window 300 when touch drag occurs in the region B 1120 than in a case in which touch drag occurs in the region A 1110 based on the touch drag signal divided by the detector 220.

As described above, the user may effectively a character in a limited display region using the characteristics of various touch drags.

Figure 13:
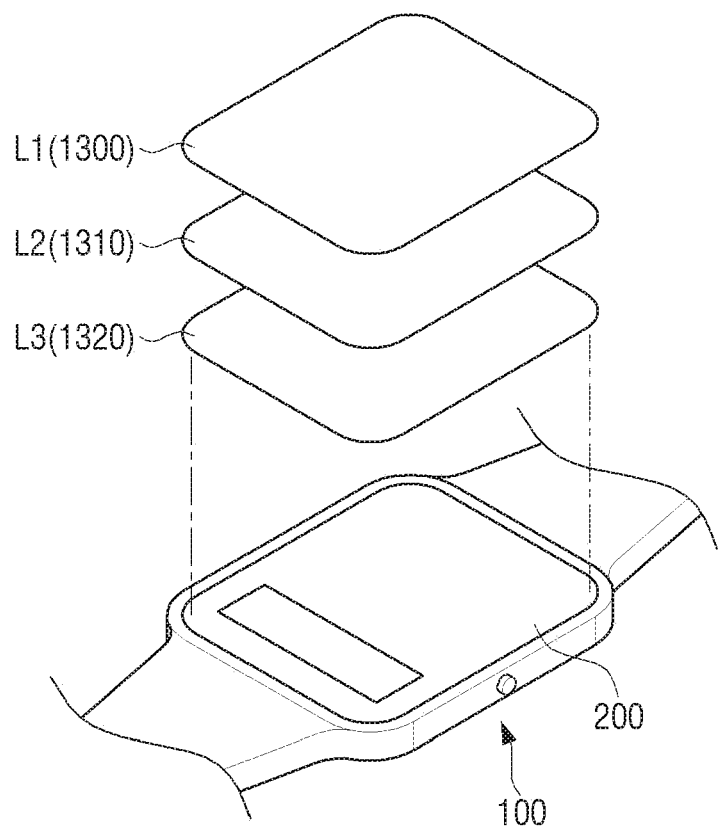
FIG. 13 is a diagram illustrating a method for differentiating touch drag for character change and touch input for another purpose according to an embodiment of the present disclosure.

FIG. 13 is a diagram illustrating a method for differentiating touch drag for character change and touch input for another purpose according to an embodiment of the present disclosure.

Referring to FIG. 13, the electronic apparatus 100 may display various information items on the display 200. For example, a new web page address may need to be input to the text input window 300 during display of a web page. Accordingly, the display 200 needs to form a plurality of layers in terms of software if necessary. For example, the display 200 may have a character input layer, a horizontal and vertical scroll layer, and a presentation layer. Basically, the display 200 may display and overlap contents such as web pages irrespective of the above layers.

In detail, FIG. 13 is a diagram illustrating a case in which layers displayed on the display 200 are virtually differentiated and displayed in terms of software. L1 1300 is a character input layer, L2 1310 is a horizontal and vertical scroll layer, and L3 1320 is a presentation layer. A user may input a preset gesture to display a desired layer on the display 200.

The character input layer L1 may be a layer for touch drag for character input. The horizontal and vertical scroll layer L2 may be a layer for scrolling a document up, down, right or left. The presentation layer L3 may be a layer for clicking an icon of content displayed on a display or changing, deleting, and selecting content in an edit box.

As described above, the user may change a character displayed on the text input window 300 displayed on the display 200. The user may select the displayed character as described above. Hereinafter, methods for selecting a character displayed on the text input window 300 will be described.

FIGS. 14A to 16C are diagrams illustrating various methods for selecting a character according to various embodiments of the present disclosure.

Figures 14A, 14B:
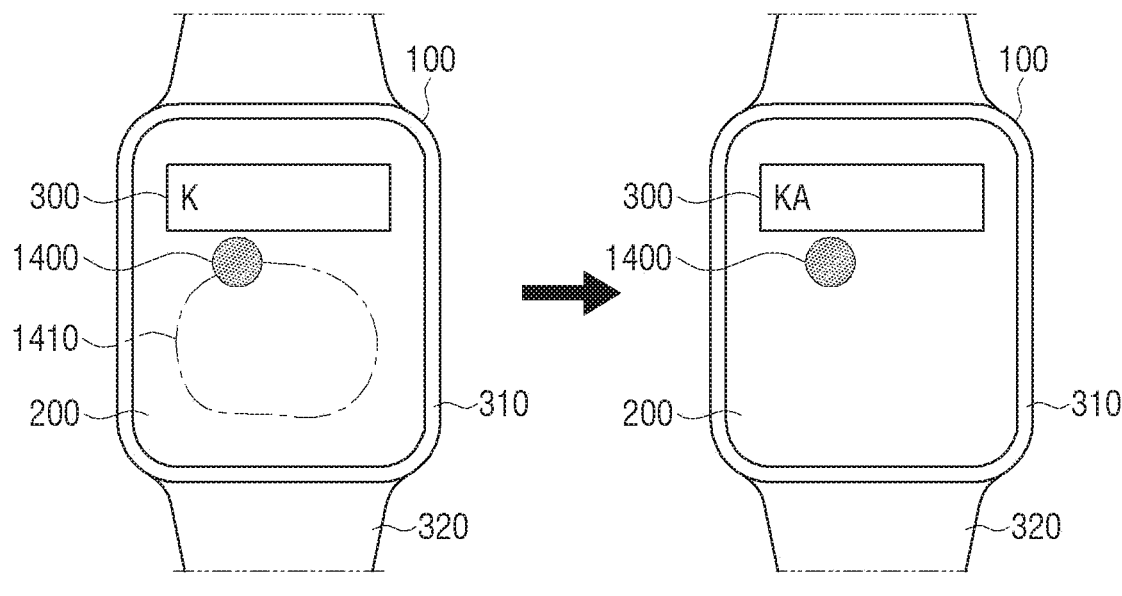
FIGS. 14A to 14C are diagrams illustrating a method for temporally stopping touch drag and selecting a character according to various embodiments of the present disclosure.

Referring to FIG. 14A, the detector 220 may detect a signal of touch drag 1410, which is generated during movement of a touch 1 1400. The controller 210 may continuously change a character displayed on the text input window 300 in response to the signal of the touch drag 1410.

Referring to FIG. 14B, the detector 220 may detect that the touch 1 1400 is not moved any longer and stops at one point for a predetermined time period or more. The controller 210 may select a character "K" displayed on the text input window 300 and display a new character "A" in response to the touch 1 1400 being positioned at one point for a predetermined time period or more. That is, when a touch is not moved for a predetermined time period, the controller 210 may select and input a currently displayed character and may display a new character for additional character input.

Figure 14C:
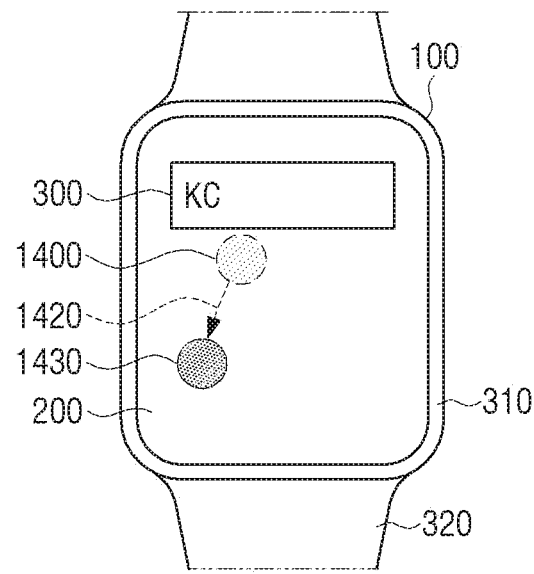

Referring to FIG. 14C, the detector 220 may detect touch drag 1420 of movement to a point of a touch 2 1430 from the point of the touch 1 1400. The controller 210 may sequentially change the character "A" displayed on a text input window to a character "C" and may sequentially display the characters in response to the touch drag 1420, which is the same as the aforementioned character changing process.

Figures 15A, 15B:
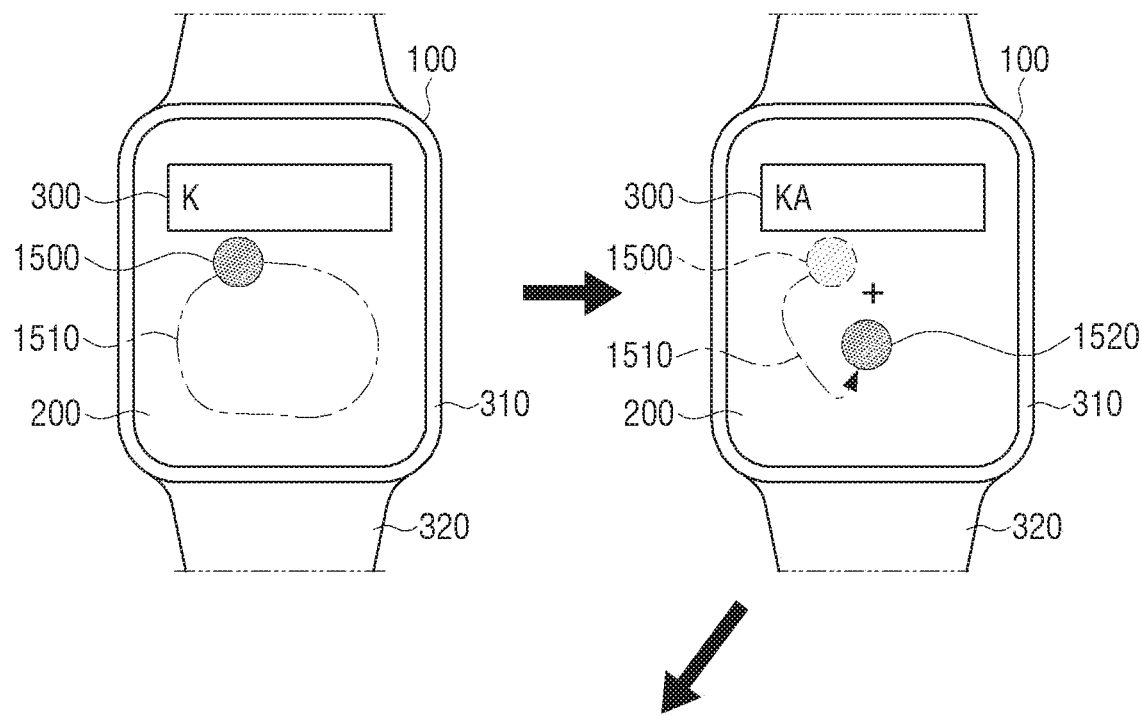
FIGS. 15A to 15C are diagrams illustrating a method for changing a progress direction of touch drag and changing a character according to various embodiments of the present disclosure.

Referring to FIG. 15A, the detector 220 may detect a signal of a touch drag 1 1510, which is generated during movement of a touch 11500. The controller 210 may continuously change a character displayed on the text input window 300 in response to the signal of the touch drag 1 1510.

Referring to FIG. 15B, the detector 220 may detect an operation of the touch drag 1 1510 of movement to a point of a touch 2 1520 from the point of the touch 11500. The point of the touch 2 1520 may be deviated from a trajectory of the touch drag 1 1510. For example, the point of the touch 2 1520 may be directed toward the central point 400 of the display 200 from the trajectory of the touch drag 1 1510. In addition, the point of the touch 2 1520 may be an imaginary central point of the trajectory of the touch drag 1 1510.

The controller 210 may select a character that is currently displayed on the text input window 300 and display a next character in response to a direction of the touch drag 1 1510 toward the point of the touch 2 1520. For example, the controller 210 may select a character "K" displayed on the text input window 300 and may further display a character "A" in response to direction change of the touch drag 1 1510.

Figure 15C:
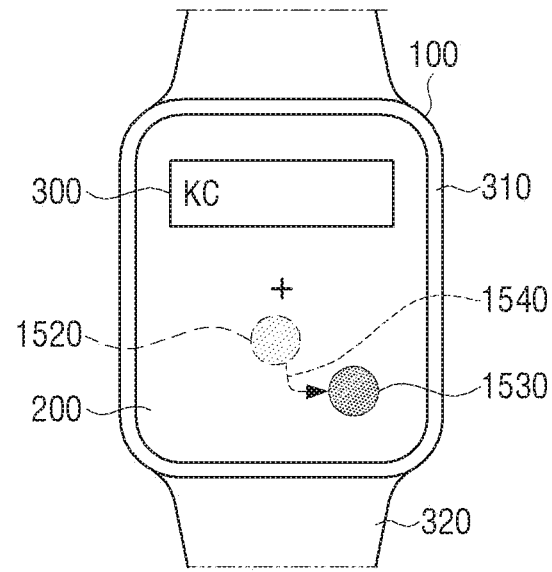

Referring to FIG. 15C, the detector 220 may detect that the touch 2 1520 is moved to a point of a touch 3 1530 through touch drag 2 1540. The controller 210 may sequentially change a character "A" displayed on the text input window 300 to a character "C" and may sequentially display the characters in response to the touch drag 2 1540.

The controller 210 may subdivide an operation for directing toward the central point 400 of the display 200 or an imaginary central point of a touch drag trajectory.

For example, when a touch is terminated at the point of the touch 2 1520, the controller 210 may select a currently displayed character and may not propose a next character. In addition, when a touch is maintained without movement at the point of the touch 2 1520 for a predetermined time period, the controller 210 may select words that have been displayed on the text input window 300 thus far or an entire word inferred from words, which have been introduced, by the controller 210 instead of selecting one displayed character.

Figures 16A, 16B:
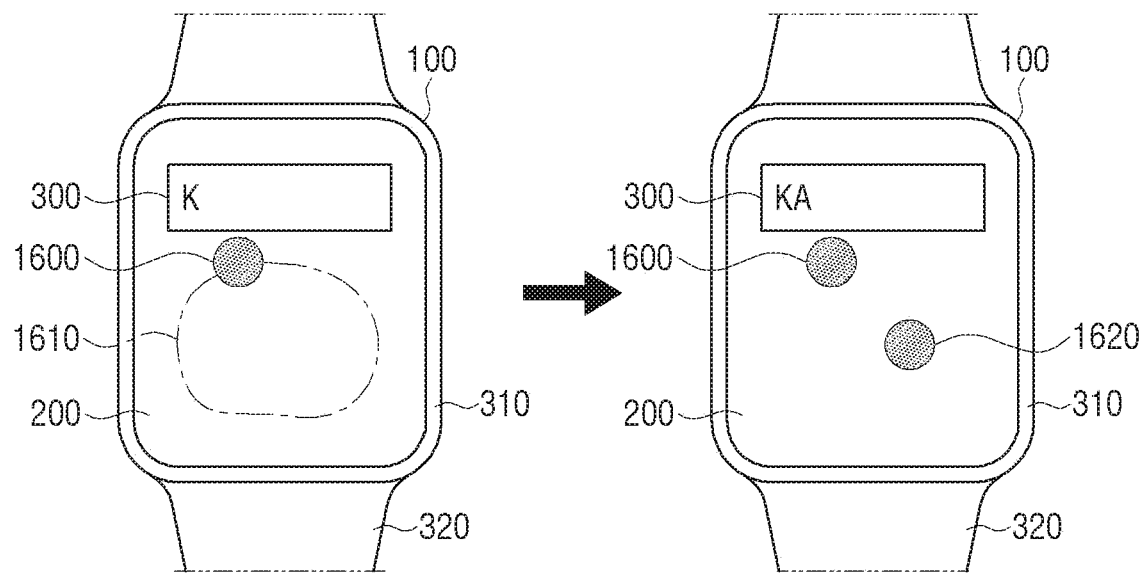
FIGS. 16A to 16C are diagrams illustrating a method for selecting a character according to other touch input other than touch drag according to various embodiments of the present disclosure.

Referring to FIG. 16A, the detector 220 may detect a signal of touch drag 11610, which is generated during movement of a touch 11600. The controller 210 may continuously change a character displayed on the text input window 300 in response to the signal of the touch drag 11610.

Referring to FIG. 16B, the detector 220 may detect another touch 2 1620 other than the touch 1 1600. The controller 210 may select a character "K" that is currently displayed on the text input window 300 and display a next character "A" in response to detection of the touch 2 1620.

Figure 16C:
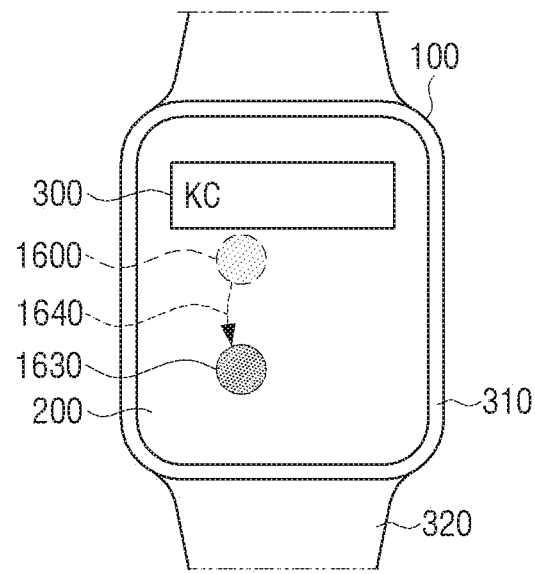

Referring to FIG. 16C, the detector 220 may detect an operation of touch drag 2 1640 in which the touch 2 1620 disappears and the point of the touch 1 1600 is moved to a point of a touch 3 1630. The controller 210 may sequentially change the character "A" displayed on the text input window 300 to a character "C" and may sequentially display the changed characters based on disappearance of the touch 2 1620 and the touch drag 2 1640.

The aforementioned operation for changing and selecting a character using a touch and touch drag operation may be applied to other items. Examples of the items may include a music list, volume control, and an item including a higher list and a lower list based thereon.

In detail, the controller 210 may apply the aforementioned operation for selecting a character to the item including the higher list and the lower list based thereon. That is, the controller 210 may display the lower list on the display 200 during the touch drag operation. In addition, the controller 210 may display a higher list including a lower list on the display 200 in response to the aforementioned operation for selecting a character.

In addition, when one higher list is selected via the aforementioned operation while each lower list is displayed in the higher list, the controller 210 may control the display 200 to select a first lower list belong to the higher list.

Thus far, the various embodiments of the present disclosure in which an item is changed and selected by touch drag performed on a two-dimensional (2D) touchscreen or touchpad has been described. However, a user gesture for changing and selecting an item may also be performed in a three-dimensional (3D) space.

For example, the user may make a gesture of stretching his or her arm in a 3D space to form an arbitrary trajectory. The user may make a gesture of moving a pointer that emits a light beam, such as a laser pointer, in a 3D space. Alternatively, the user may make a gesture of holding an object that detects movement, such as a remote controller or a portable terminal apparatus, and moving the object in a 3D space. The electronic apparatus 100 may perform the aforementioned operation such as item change, change speed adjustment, and item selection based on the movement characteristic of the gestures.

Hereinafter, a case of using one pointer among the aforementioned examples will be described. When a user emits light in a 3D space, the electronic apparatus 100 may track a trajectory using, as the detector 220, software (SW) that is capable of photographing an image and tracking light via a 2D camera. In addition, the electronic apparatus 100 may use, as the detector 220, a 3D sensor that is capable of measuring a depth of a subject, such as a time of flight (TOF) camera. A 3D operation may be modified to a plurality of 2D operations.

Figures 17A, 17B:
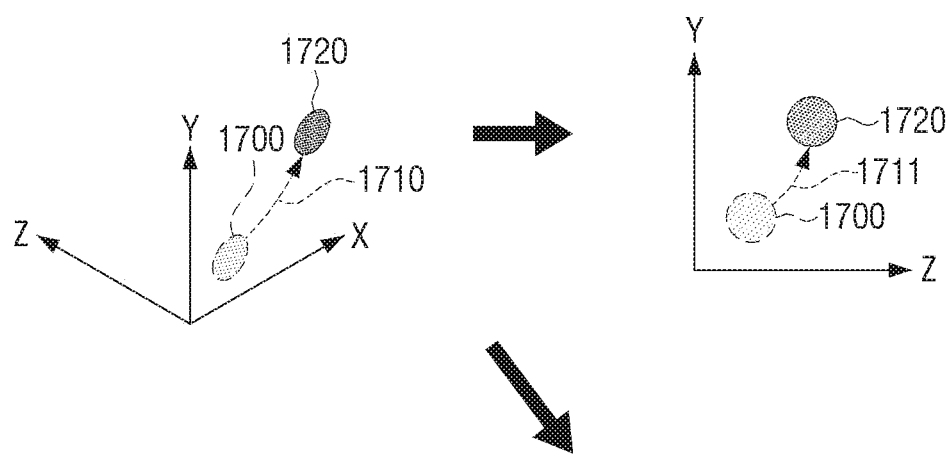
FIGS. 17A to 17C are diagrams illustrating a case in which a gesture made in a three-dimensional (3D) space is converted into a two-dimensional (2D) gesture and displayed according to various embodiments of the present disclosure.
Figure 17C:
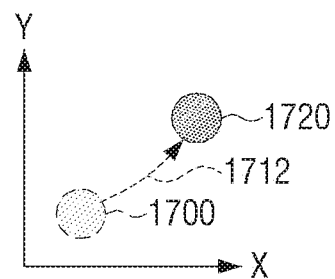

FIGS. 17A to 17C are diagrams illustrating a case in which a gesture made in a 3D space is converted into a 2D gesture and displayed according to various embodiments of the present disclosure.

Referring to FIG. 17A, the detector 220 may detect an operation of movement 1 1710 of movement to a point of a pointer 2 1720 from a point of a pointer 1 1700 in a 3D coordinate system with XYZ axes. The controller 210 may 2-dimensionally convert a trajectory of the movement 1 1710.

FIG. 17B is a diagram in which the movement 1 1710 is converted and displayed in YZ axes. FIG. 17C is a diagram in which the movement 1 1710 is converted and displayed in XY axes. As described above, the he controller 210 may modify a 3D operation into a plurality of 2D operations. For example, the detector 220 may detect the movement 1 1710 in a 3D coordinate system. The controller 210 may convert the movement 1 1710 into movement 2 1711 with respect to YZ axes and convert the movement 1 1710 into movement 3 1712 with respect to XY axes. The controller 210 may use a plurality of control operations of changing an item using the two movements. In addition, the controller 210 may use an operation for comparing the two movements to select movement with a longer distance and controlling an item.

Figure 18:
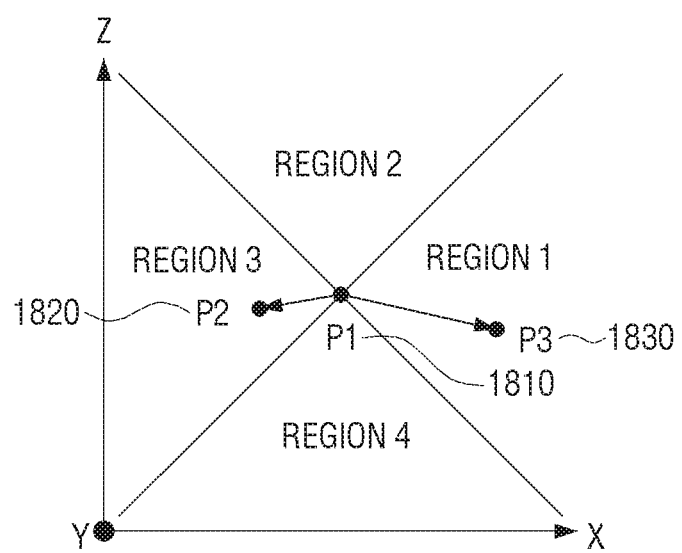
FIG. 18 is a diagram illustrating a case in which one of two gesture movements converted into a 2D gesture according to an embodiment of the present disclosure.

FIG. 18 is a diagram illustrating a case in which the controller 210 selects movement with a longer distance from two converted movements according to an embodiment of the present disclosure.

FIG. 18 is a diagram illustrating a case in which a XZ plane is divided into four regions. P1 1810 may be a start point of a gesture. Analyzing an operation in which the P1 1810 is moved to a region 1 or a region 3, movement in an X axis is longer than movement in a Z axis. For example, when the P1 1810 is moved to P2 1820 or P3 1830, a movement distance in an X axis is greater than a movement distance in a Z axis. Accordingly, the controller 210 may change items associated with the X axis in which movement is longer and may display the items on the display 200.

When the P1 1810 is moved to a region 2 or a region 4, a movement distance in a Z axis is greater than a movement distance in an X axis. Accordingly, the controller 210 may change items associated with the Z axis in which movement is longer.

When a list associated with one axis is changed, the possibility that a subsequent gesture changes a list associated with the axis with which the list is already associated may be high. Accordingly, when the controller 210 connects a 3D gesture to change in an item associated with the X axis as described above, the controller 210 may control the display 200 to enlarge a region 1 and a region 3 and to reduce a region 2 and a region such that a user may easily adjust an X-axis list.

Figures 19A, 19B:
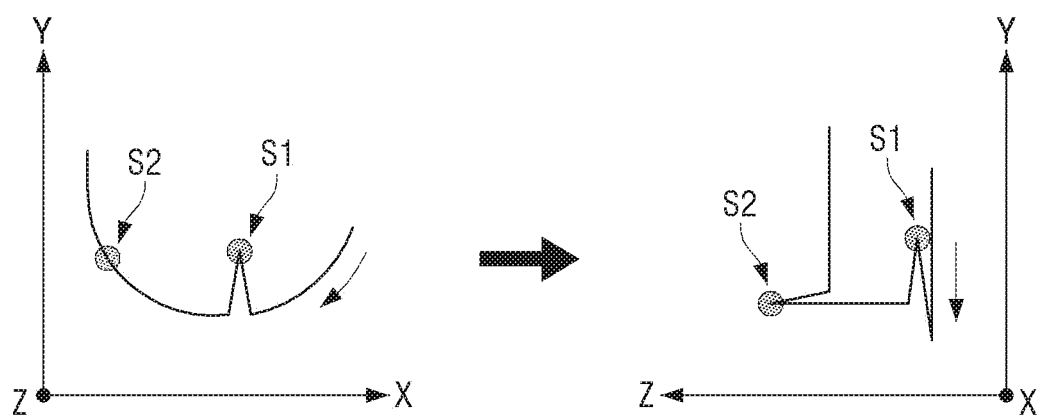
FIGS. 19A and 19B are diagrams illustrating an operation for selecting an item in a 3D coordinate system according to various embodiments of the present disclosure.

FIGS. 19A and 19B are diagrams illustrating an operation for selecting an item in a 3D coordinate system according to various embodiments of the present disclosure.

Referring to FIGS. 19A and 19B, the operation for selecting an item in a 3D coordinate system is not necessarily performed in an axis in which the corresponding item is changed. FIG. 19A illustrates a diagram illustrating a gesture in an XY plane. An item associated with an X axis is changed based on a drag operation. Two selecting operations S1 and S2 occur. Although the controller 210 changes an item associated with an X axis, S2 of the two selecting operations may be performed with respect to another plane instead of the X axis.

Referring to FIG. 19B, S2 is performed on a YZ plane. That is, the controller 210 may also recognize direction change or characteristic of a gesture and select an item on another plane other than an axis associated with item change.

The electronic apparatus 100 may be embodied as a smart phone or other various apparatus, as described above.

FIGS. 20A to 20D are diagrams illustrating various electronic apparatuses 100 that are capable of performing the operations stated in the specification according to various embodiments of the present disclosure.

Figure 20A:
FIGS. 20A to 20D are diagrams illustrating various electronic apparatuses that are capable of performing the operations stated in the specification according to various embodiments of the present disclosure.

Referring to FIG. 20A, the electronic apparatus 100 may be a smart watch 2001.

Figure 20B:
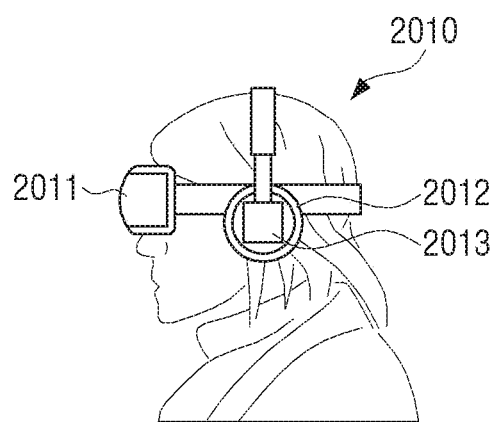

Referring to FIG. 20B, the electronic apparatus 100 may be smart glasses or an HMD 2010. When the electronic apparatus 100 is embodied as smart glasses or an HMD 2010, the electronic apparatus 100 may include a display 2011 for reproducing an image, a voice reproducer 2012 for reproducing voice, and the detector 2013 for recognition of a user touch. The detector 2013 may recognize a user touch or touch drag and may be detector 220. The controller 210 may display a user interface on the display 2011 in response to a detected signal. The detector 2013 may be disposed in another region separated from the display 2011. FIG. 20B illustrates a case in which the detector 2013 is disposed at a user ear in the form of touchpad. The user may touch the detector 2013 at the user ear and input touch drag to select a desired item while viewing the user interface displayed on the display 2011.

Figure 20C:
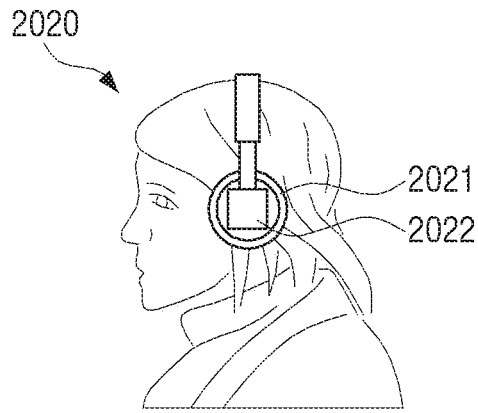

Referring to FIG. 20C, the electronic apparatus 100 may be a headphone 2020. The electronic apparatus 100 may include a voice reproducer 2021 for reproducing sound and a detector 2022 for detecting a user touch. The detector 2022 may detect a user touch or touch drag signal and may be detector 220. The controller 210 may control the voice reproducer 2021 to notify the user of change or selection of an item as a sound in response to the detected signal. Like with the detector 2013 in FIG. 20B, as illustrated in FIG. 20C, the detector 2022 may also be disposed at a user ear.

Figure 20D:
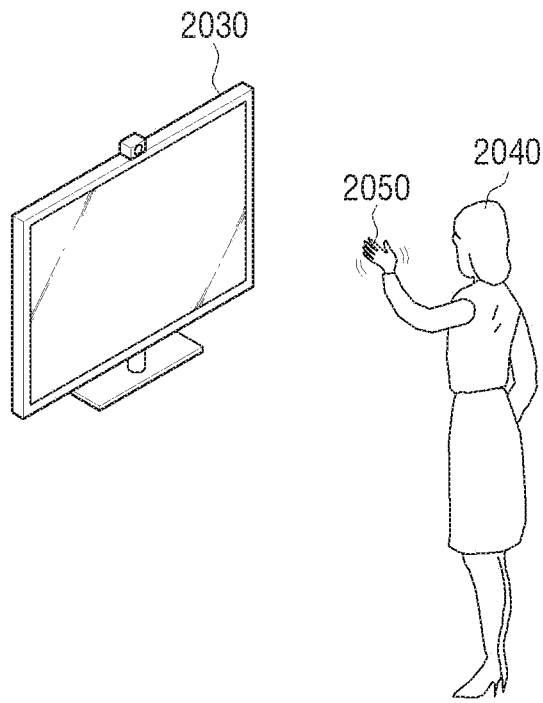

Referring to FIG. 20D, the electronic apparatus 100 may be a television (TV) 2030 or a set-top box including the TV 2030. The electronic apparatus 100 may detect a gesture 2050 of a user 2040 using the detector 220 that is capable of recognizing a gesture. The controller 210 may display change or selection of an item to the user through the display 200 of the electronic apparatus 100 in response to the detected gesture 2050.

Figure 21A:
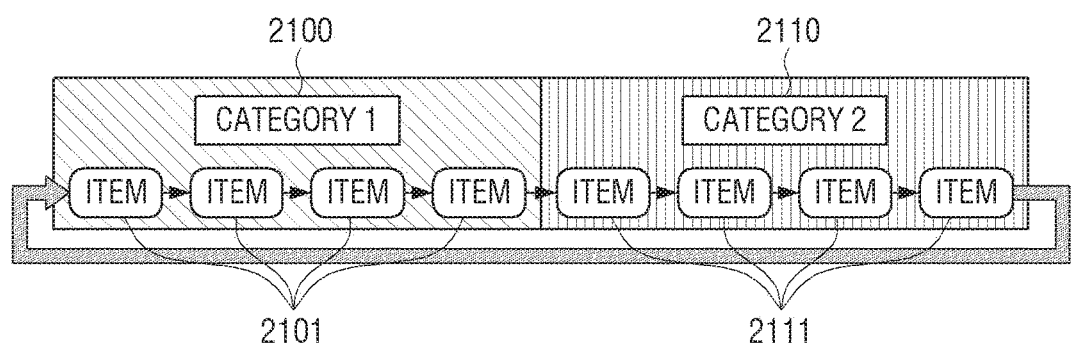
FIGS. 21A to 21B are diagrams illustrating various methods of reproducing items differentiated for respective categories according to various embodiments of the present disclosure.
Figure 21B:
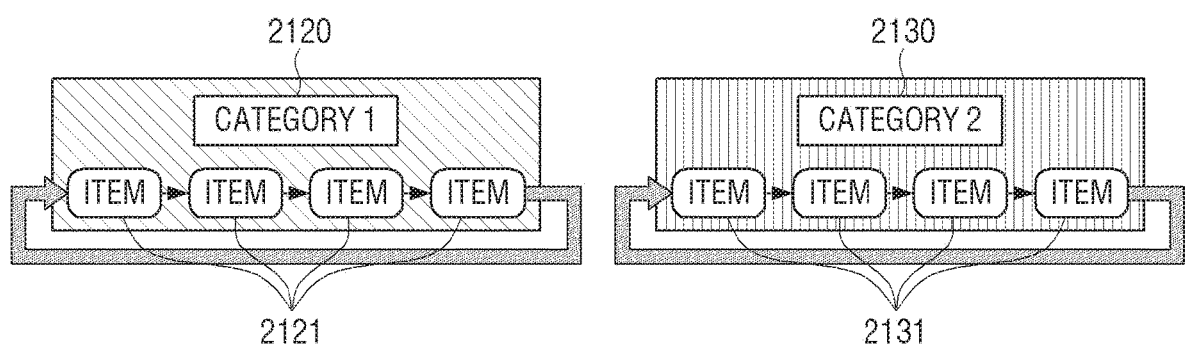

FIGS. 21A and 21B are diagrams illustrating various methods of reproducing items differentiated for respective categories according to various embodiments of the present disclosure.

Referring to FIGS. 21A and 21B, a category refers to a division unit for differentiating items for respective types. In detail, the category may include an alphabet, Korean, a number, a special symbol, a picture, video, a web page, an application item, and so on.

As described above, the controller 210 of the electronic apparatus 100 may change an item or a character in response to the user touch or touch drag signal. Referring to FIGS. 21A and 21B, a category 1 2100 may include a plurality of items or characters 2101. A category 2 2110 may also include a plurality of items or characters 2111.

FIG. 21A is a diagram illustrating a case in which items or characters which belong to different categories are simultaneously changed.

The controller 210 may change the items or characters in response to the touch or touch drag signal received from the detector 220. In this case, the items or characters 2101 belonging to the category 1 2100 and the items or characters 2111 belonging to the category 2 2110 may be sequentially displayed on the display 200. For example, when the category 1 2100 corresponds to Korean consonant and vowel and the category 2 2110 corresponds to an English alphabet, the Korean consonant and vowel and the English alphabet may be sequentially displayed in the case of FIG. 21A.

FIG. 21B is a diagram illustrating a case in which items or characters belonging to different categories are changed for the respective categories.

The controller 210 may change the items or the characters in response to the touch or touch drag signal received from the detector 220. In this case, items or characters 2121 belonging to a category 1 2120 and items or characters 2131 belonging to a category 2 2130 may not be sequentially displayed on the display 200. For example, when the category 1 2120 corresponds to Korean consonant and vowel and the category 2 2130 corresponds to an English alphabet, the controller 210 may sequentially display only the Korean consonant and vowel or may sequentially display only the English alphabet in response to the user touch drag signal and so on. In response to a preset gesture being received, the controller 210 may select items or characters to be reproduced between the category 1 2120 and the category 2 2130.

FIGS. 22A to 22D are diagrams illustrating a case in which the electronic apparatus 100 changes speed of changing an item according to various embodiments of the present disclosure. FIGS. 22A to 22D correspond to a structure in which items belong to lower portions of respective categories.

Figure 22A:
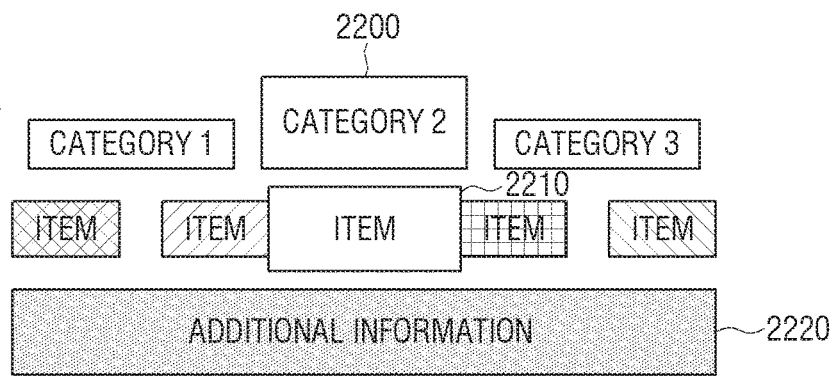
FIGS. 22A to 22D are diagrams of a user interface when speed of changing an item by an electronic apparatus is changed according to various embodiments of the present disclosure.

FIG. 22A illustrates an image configuration in which an item 2210 containing a character is slowly changed. A category 2200, the item 2210 containing a character, and additional information 2220 about a selected item may be displayed. The selected category 2200 and the item 2210 may be displayed to be differentiated from other categories and items.

Figure 22B:
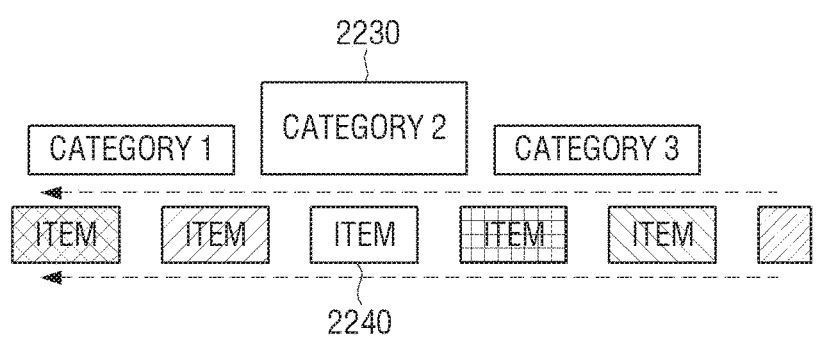

FIG. 22B illustrates an image configuration in which an item 2240 containing a character is slowly changed. A selected category 2230 may be displayed to be differentiated from other categories. The items 2240 may be displayed while being continuously changed.

Figure 22C:
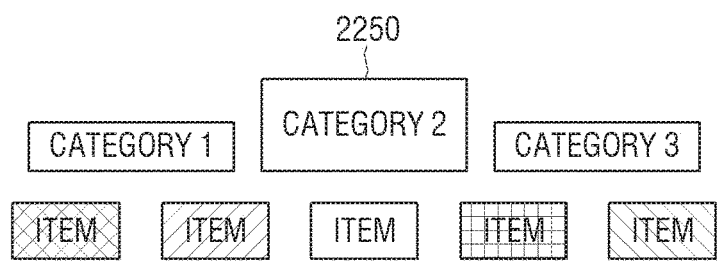

FIG. 22C illustrates an image configuration in which a category is very rapidly changed. A selected category 2250 may be displayed to be differentiated from other categories. Only items with priority among items belong to a currently selected category may be selected.

Figure 22D:
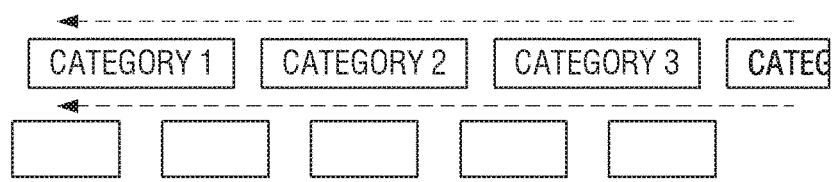

FIG. 22D illustrates an image configuration in which a category is most rapidly changed. Categories may be sequentially and rapidly changed along with an animation effect whereby the categories are continuously changed. Items belonging to a category may not be displayed.

Similarly, when the electronic apparatus 100 is a headphone, the controller 210 may notify a user of change in items containing a character as sound.

For example, the electronic apparatus 100 may sequentially reproduce characters "Abba". When a character is slowly changed, the controller 210 may reproduce characters on a character basis, such as "A", "b", "b", and "a". When a character is rapidly changed, the controller 210 may indicate a situation in which a signal sound such as "tti", "ti", "ti" is generated. When a character or an item is very rapidly changed, the controller 210 may reproduce a title of a category to which the character or the item belongs. When a character or an item is most rapidly changed, the controller 210 may generate a signal sound such as "ttu", "ttu", "ttu" according to change in a category to which the character or the item belongs. The signal sound may be different from the signal sound generated when the item or the character is rapidly changed.

Figure 23:
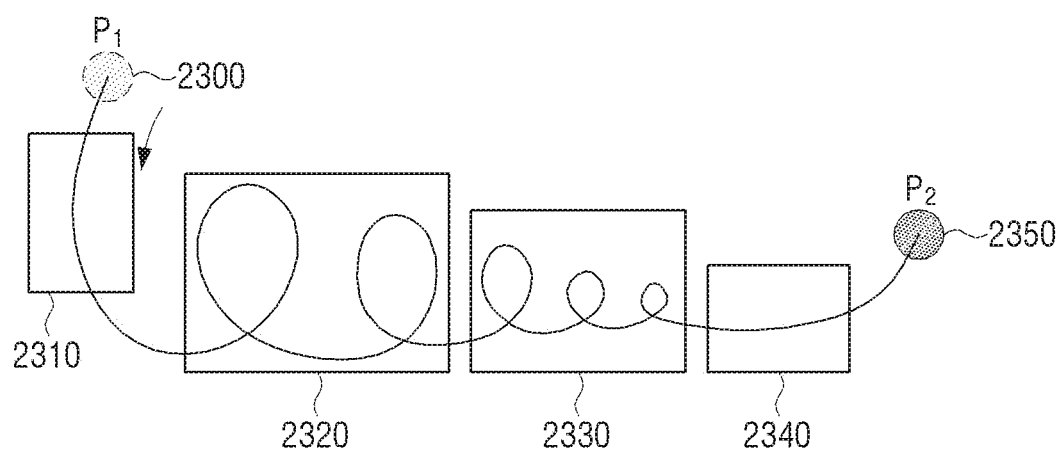
FIG. 23 is a diagram illustrating various types of gestures of changing speed of changing items according to an embodiment of the present disclosure.

FIG. 23 is a diagram illustrating a type of a gesture of differently changing items according to an embodiment of the present disclosure.

Referring to FIG. 23, P1 2300 may be a start point of the gesture and P2 2350 may be an end point of the gesture. In FIG. 23, four gestures types may be displayed. A first gesture 2310 may correspond to a circular shape with a small diameter. The first gesture 2310 may be an operation for rapidly changing an item. A second gesture 2320 may correspond to an operation for consecutively drawing a small circle. The second gesture 2320 may be an operation for very rapidly changing an item. A third gesture 2330 may correspond to an operation for consecutively drawing a very small circle. The third gesture 2330 may be an operation for very rapidly changing an item. A fourth gesture 2340 may correspond to a circular shape with a very large diameter. The fourth gesture 2340 may be an operation for slowly changing an item.

FIGS. 24A to 24F are diagrams illustrating various user interfaces in which a text is displayed on the text input window 300 during character change according to various embodiments of the present disclosure.

Figure 24A:
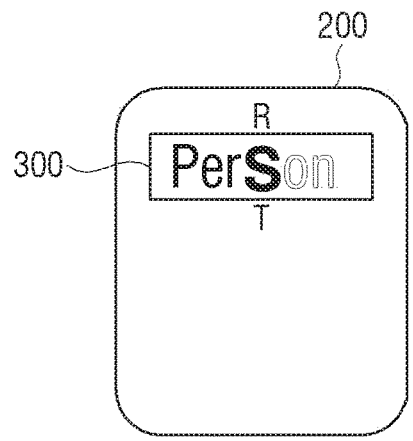
FIGS. 24A to 24F are diagrams illustrating various user interfaces in which a text is displayed on a display during character change according to various embodiments of the present disclosure.

FIG. 24A illustrates a user interface in which a changed character is displayed on the display 200 while being rotated in a vertical direction. That is, a previous character "R" and a next character "T" in an alphabet order may be displayed above and below a character "S". In response to a partial word being input to the text input window 300, the controller 210 may recommend at least one complete word including the input partial word.

Figure 24B:
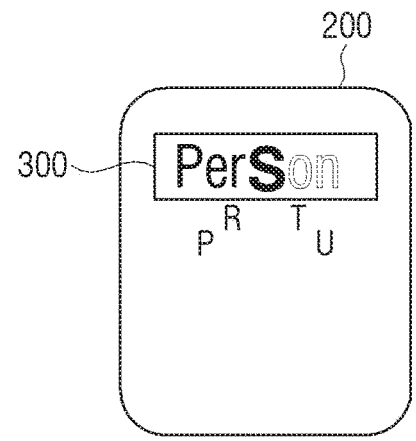

FIG. 24B illustrates a user interface in which a changed character is displayed on the display 200 while being rotated in a horizontal direction. That is, a previous character "R" and a next character "T" in an alphabet order may be displayed at an upper left side and a lower right side of a character "S". In response to a partial word being input to the text input window 300, the controller 210 may recommend at least one complete word "person" including the input partial word.

Figure 24C:
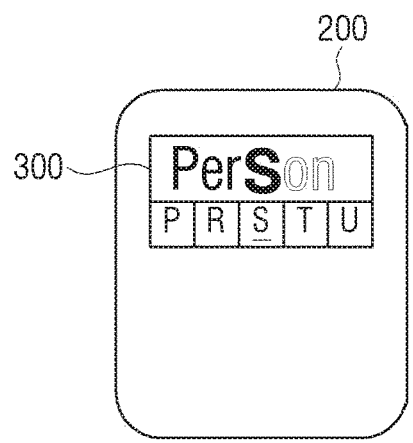

FIG. 24C illustrates a user interface in which a changed character is displayed on the display 200 while sliding in a horizontal direction. That is, a previous character "R", a currently displayed character "S", and a next character "T" in an alphabet order may be displayed below a character "S". In response to a partial word being input to the text input window 300, the controller 210 may recommend at least one complete word including the input partial word.

Figure 24D:
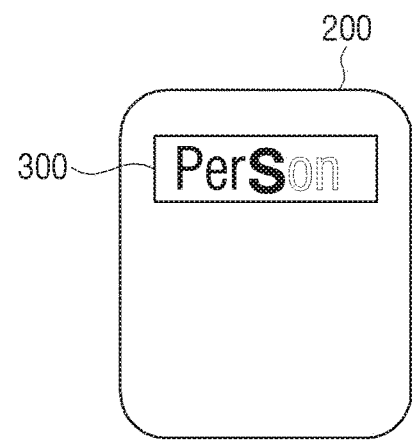

FIG. 24D illustrates a case in which a user interface is not displayed. When a user is already accustomed to the current function, the controller 210 may be set not to display a user interface. In this case, in response to a partial word being input to the text input window 300, the controller 210 may also recommend at least one complete word including the input partial word.

Figure 24E:
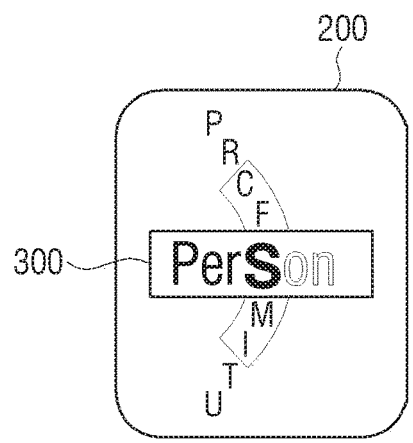

FIG. 24E is a diagram illustrating a user interface for recommending various words to be completed from characters that have been displayed thus far.

Referring to FIG. 24E, characters are currently selected by a user to "Per" in the text input window 300. In addition, the controller 210 may display a character "S" in response to a detected signal. Accordingly, the controller 210 may display "Person" that includes a currently displayed "S" and is to be recommended.

The controller 210 may display words for completing a word to be inferred from a word "Per" instead of a character "S". For example, the controller 210 may display "C" of "Perception" on the display 200. In addition, the controller 210 may display "F" of "Perfect" on the display 200. Likewise, the controller 210 may display "M" for "Permanent" and "I" for "Periodic" on the display 200.

Figure 24F:
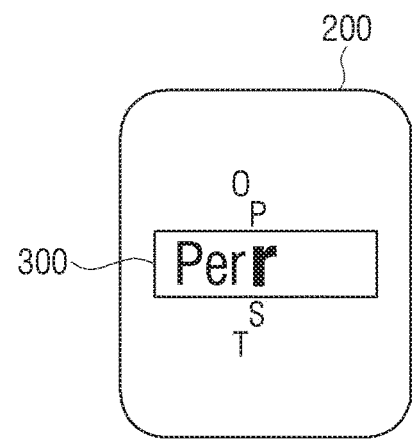

Referring to FIG. 24F, the controller 210 may not display another user interface even if a character displayed on a text input window is changed.

Figure 25:
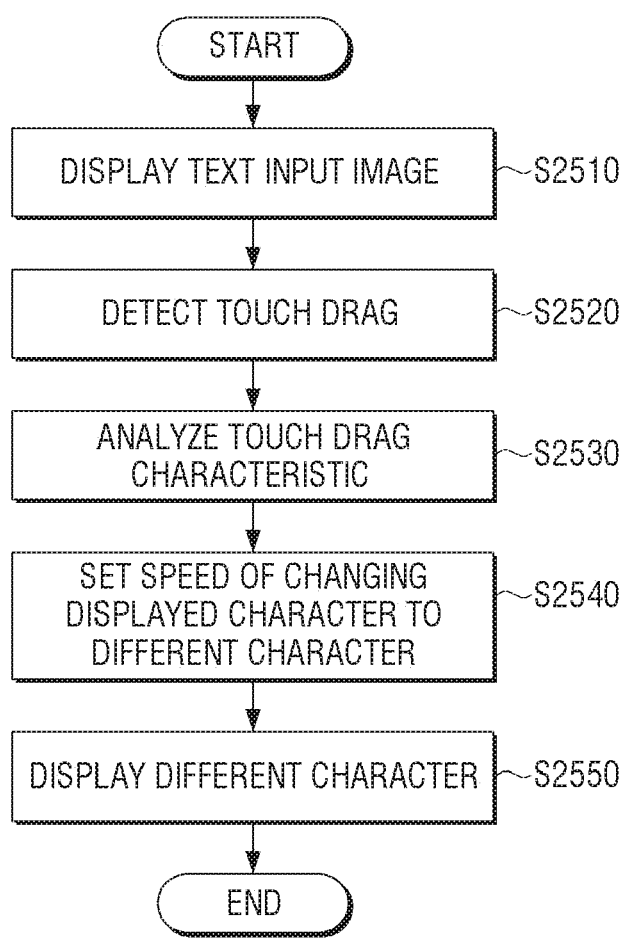
FIG. 25 is a flowchart of a method for adjusting speed of changing a character according to an embodiment of the present disclosure.

FIG. 25 is a flowchart of a method for adjusting speed of changing a character according to an embodiment of the present disclosure.

Referring to FIG. 25, the electronic apparatus 100 may adjust the change speed of a character displayed on the text input window 300 based on a user touch drag input.

For example, in operation S2510, the electronic apparatus 100 may display a text input image on a display. That is, the text input window 300 may be displayed. In operation S2520, the electronic apparatus 100 may detect a touch drag signal. In operation S2530, the electronic apparatus 100 may analyze the characteristic of touch drag.

In detail, the electronic apparatus 100 may determine whether a progress direction of the touch drag is a direction away from an arbitrary point on the display or a direction toward the arbitrary point. In addition, the electronic apparatus 100 may determine whether a curvature of a trajectory of a touch drag is greater or smaller than an already drawn curvature. In addition, the electronic apparatus 100 may determine whether touch drag is performed in a preset region A or preset region B of the detector 220

The electronic apparatus 100 may differently adjust speed of changing a character displayed on the text input window 300 to another character using the aforementioned determination result in operation S2540. For example, the electronic apparatus 100 may set character change speed of a case in which a trajectory of touch drag is directed toward an arbitrary point on a display to be greater than in a case in which a trajectory of touch drag is away from an arbitrary point on a display.

The electronic apparatus 100 may set character change speed of a case in which a curvature of a curved trajectory drawn by touch drag is smaller than a curvature of an already drawn curved trajectory to be greater than character change speed of a case in which a curvature of a curved trajectory drawn by touch drag is greater than a curvature of an already drawn curved trajectory.

The electronic apparatus 100 may set character change speed of a case in which touch drag is detected from a region A to be greater than in a case in which touch drag is detected from a region B.

The electronic apparatus 100 may change a character displayed on the text input window 300 to another character and display the changed character at the speed determined in operation S2550.

Although FIG. 25 illustrates the embodiment of the present disclosure in which character change speed is changed according to the characteristic of touch drag, other options other than the character change speed may be changed according to the characteristic of touch drag according to an embodiment of the present disclosure. For example, a character type (alphabet, number, Korean, etc.), a character size, color, font, and so on may be changed according to the characteristic of touch drag.

The text input method described with reference to FIG. 25 may be performed by the electronic apparatus 100 of FIG. 2, but the embodiment of the present disclosure is not limited thereto.

Figure 26:
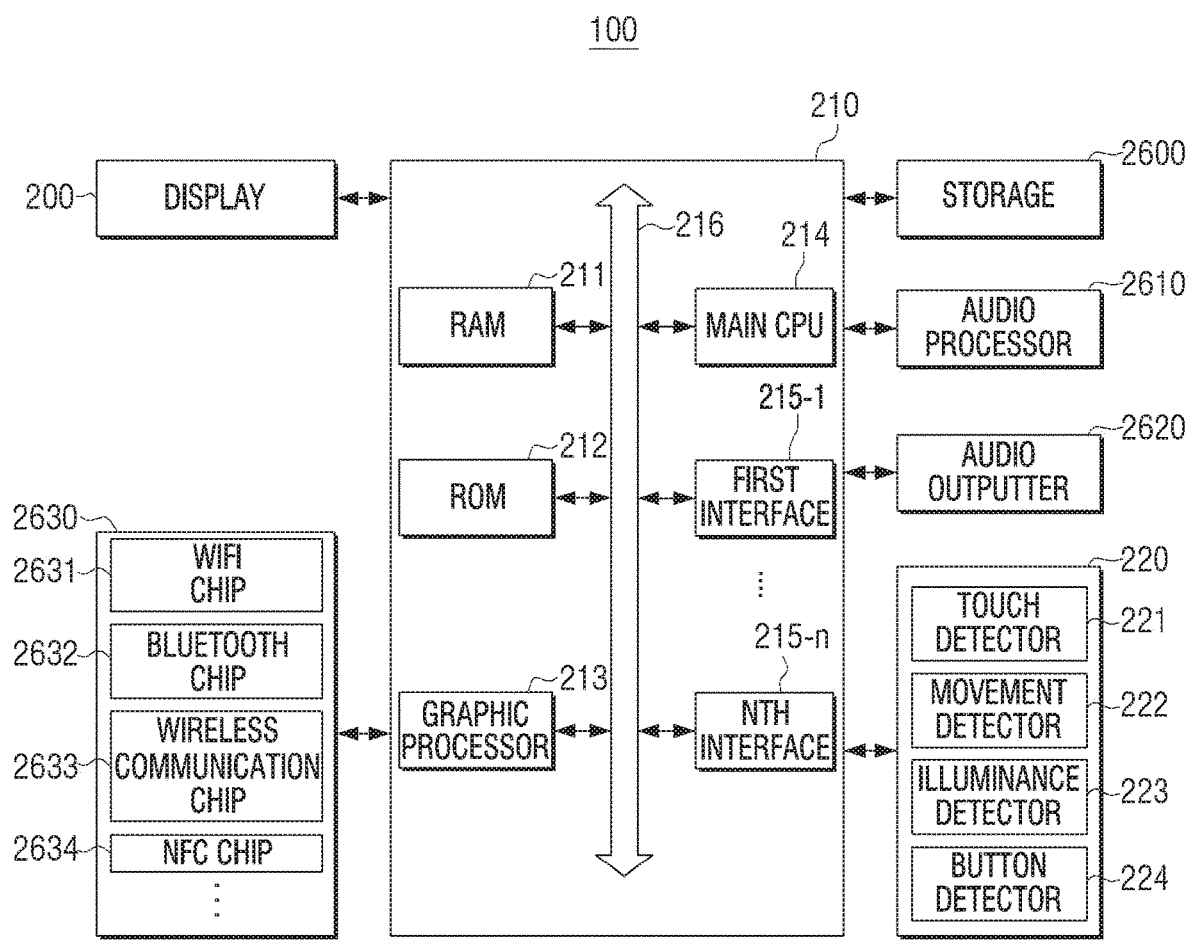
FIG. 26 is a block diagram illustrating a configuration of an electronic apparatus according to an embodiment of the present disclosure.

FIG. 26 is a block diagram illustrating a configuration of the electronic apparatus 100 according to an embodiment of the present disclosure.

Referring to FIG. 26, the electronic apparatus 100 may include at least one of the display 200, a communicator 2630, a storage 2600, an audio processor 2610, an audio outputter 2620, the detector 220, and the controller 210. The configuration of the electronic apparatus 100 illustrated in FIG. 26 is merely an embodiment of the present disclosure, and thus the embodiment of the present disclosure is not limited thereto. Accordingly, needless to say, according to a type or purpose of the electronic apparatus 100, some of components of the electronic apparatus 100 illustrated in FIG. 26 may be omitted or modified or other components may be added.

The display 200 may display various images in a display region. The various images may be, for example, an application execution image. The various images may display various types of contents (e.g., video or text), a UI element for control of content or the electronic apparatus 100, and so on.

The display 200 may have various sizes. For example, the display 200 may have a size of 3 inches, 4 inches, 4.65 inches, 5 inches, 6.5 inches, 8.4 inches, and so on.

The display 200 may be embodied as various types of display panels. For example, the display panel may be embodied using various display technologies such as a liquid crystal display (LCD), an organic light emitting diode (OLED), an active-matrix OLED (AM-OLED), liquid crystal on silicon (LcoS) or digital light processing (DLP).

The display 200 may be coupled to at least one of a front surface region, a lateral surface region, and a rear surface region of the electronic apparatus 100 in the form of a flexible display. The flexible display may be bent, curved, or rolled without being damaged through a thin and flexible substrate like paper.

The display 200 may be coupled to a touch detector 221 to be embodied as a touchscreen with a layered structure. The touchscreen may have a function of detecting a touch input pressure as well as a touch input position and a touched area in addition to a display function and may also have a function of detecting a proximity touch as well as a real-touch.

The communicator 2630 may be a component that communicates with various types of external devices according to various types of communication methods. The communicator 2630 may include at least one of a Wi-Fi chip 2631, a Bluetooth chip 2632, a wireless communication chip 2633, and a near field communication (NFC) chip 2634. The controller 210 may communicate with an external server or various external devices using the communicator 2630.

The audio processor 2610 may be a component that processes audio content of image content. The audio processor 2610 may perform various processing processes such as decoding, amplification, and noise filtering on audio data. The audio data processed by the audio processor 2610 may be output to the audio outputter 2620.

The audio outputter 2620 may be a component that outputs various notification sounds or voice messages as well as various audio data items on which various processing processes such as decoding, amplification, and noise filtering are performed by the audio processor 2610. In particular, the audio outputter 2620 may be embodied as a speaker, but this is merely an embodiment of the present disclosure, and thus the audio outputter 2620 may be embodied as an output terminal for outputting audio data.

According to an embodiment of the present disclosure, when the electronic apparatus 100 is a headphone, the controller 210 may detect a user touch drag signal and so on and reproduce various sounds to the user using the audio outputter 2620. As described above, for example, the controller 210 may reproduce a text on a character basis according to touch drag speed and generate a separate signal sound.

The detector 220 may detect various user inputs. In addition, the detector 220 may detect at least one of various changes such as pose change, illuminance change, and acceleration change of the electronic apparatus 100 and transmit an electrical signal corresponding to the change to the controller 210. That is, the detector 220 may detect state change performed by the electronic apparatus 100, generate a detection signal according to the state change, and transmit the detection signal to the controller 210.

In the present disclosure, the detector 220 may include various sensors, and power is supplied to at least one set sensor according to control of the detector 220 (or based on user setting) during driving of the electronic apparatus 100, and thus the detector 220 may detect state change of the electronic apparatus 100. In this case, the detector 220 may include various sensors and include at least one device of any type of sensing devices for detecting state change of the electronic apparatus 100. For example, the detector 220 may include at least one of various sensing devices such as a touch sensor, an acceleration sensor, a gyro sensor, an illuminance sensor, a proximity sensor, a pressure sensor, a noise sensor (e.g., a microphone), a video sensor (e.g., a camera module), a pen detection sensor, and a timer.

The detector 220 may be divided into the touch detector 221, a movement detector 222, an illuminance detector 223, a button detector 224, and so on according to a detection purpose, but the embodiment of the present disclosure is not limited thereto, and thus the detector 220 may be divided according to various purposes.

In addition, the detector 220 may not be limited to physical division, and thus one or more sensors may be integrated to function as the detectors 221, 222, 223, and 224. In addition, according to a method for embodying the detector 220, some of components or functions of the detector 220 may be included in the controller 210.

The touch detector 221 may detect user finger input and output a touch event value corresponding to the detected touch signal. A touch panel of the touch detector 221 may be installed below the display 200. In detail, the touch detector 221 may detect the touch or touch drag that has been described in the aforementioned various embodiments of the present disclosure. In response to touch drag being detected, the touch detector 221 may transmit a coordinate value of a touched point to the controller 210. The controller 210 may determine the characteristic of touch drag based on the coordinate value and, accordingly, may perform an operation such as item display, item change, and item selection. These operations have been described with regard to the aforementioned various embodiments of the present disclosure, and thus a repeated description thereof will be omitted herein.

The touch detector 221 may acquire an output signal according to a user input from a touch sensor. The touch detector 221 may derive user input information such as a touch position, a touch coordinate, a touch number, touch intensity, a cell ID, a touch angle, or a touched area from signals values and may determine a type of touch input using the derived user input information. In this case, the touch detector 221 may determine a type of touch input using a touch recognition algorithm, touch pattern data, and so on, which are stored in a memory (not shown) of a touch panel. When a type of touch input is determined, the touch detector 221 may transmit information about the type of touch input to the controller 210. As described above, the touch detector 221 may detect a proximity touch position (or a hovering position) input by a user.

In this case, the controller 210 may instead perform some of functions of the touch detector 221. For example, the touch detector 221 may transmit a signal value acquired from a touch sensor or the user input information derived from the signal value to the controller 210. The controller 210 may determine a type of touch input using a touch recognition algorithm, touch pattern data, and so on, which are stored in the storage 2600. For example, when a telephone application is executed, the controller 210 may detect selection of a call button of the telephone application from the user input information or the type of touch input and may transmit a call request to a counterpart through the communicator 2630.

The movement detector 222 may detect movement (e.g., rotation movement and tilting movement) of the electronic apparatus 100 using at least one of an acceleration sensor, a tilt sensor, a gyro sensor, and a 3-axis magnetic sensor. In addition, the movement detector 222 may transmit a generated electrical signal to the controller 210. For example, the movement detector 222 may measure acceleration obtained by summing motion acceleration of the electronic apparatus 100 and gravitational acceleration but may measure only gravitational acceleration without movement of the electronic apparatus 100.

The illuminance detector 223 may detect surrounding brightness of the electronic apparatus 100 using an illuminance sensor. The illuminance sensor may detect brightness using a photoelectric cell but may use a photoelectric tube under very low brightness. A cadmium-sulfide (CdS) illuminance sensor as an example of the illuminance sensor may be installed at each opposite surface of the electronic apparatus 100 and may detect surrounding brightness of the electronic apparatus 100. The illuminance detector 223 may convert a voltage acquired through the illuminance sensor into a digital value and transmit the digital value to the controller 210.

The detector 220 may further include a pen detector (e.g., a pen recognition panel) (not shown). The pen detector may detect user pen input according to management of a user touch pen (e.g., stylus pen and digitizer pen) and output a pen proximity event value or a pen touch event value. The pen detector may be embodied in, for example, an electromagnetic radiation (EMR) manner and may detect touch or proximity input according to change in intensity of an electromagnetic field due to pen proximity or touch.

A microphone (not shown) may receive user voice (e.g., photograph start, photograph stop, or photograph end) for control of a medical device through the electronic apparatus 100 and may recognize the user voice through a voice recognition module. In addition, the recognition result may be transmitted to the controller 210. In this case, the voice recognition module may be positioned in a part of the controller 210 or outside the electronic apparatus 100 instead of the microphone.

The controller 210 (or a processor) may control an overall operation of the electronic apparatus 100 using various programs stored in the storage 2600.

The controller 210 may include a random access memory (RAM) 211, a read only memory (ROM) 212, a graphic processor 213, a main central processing unit (CPU) 214, first to $n^{th}$ interfaces 215-1 to 215-$n$, and a bus 216. In this case, the RAM 211, the ROM 212, the graphic processor 213, the main CPU 214, and the first to $n^{th}$ interfaces 215-1 to 215-$n$ may be connected to each other through the bus 216.

The RAM 211 may store an operating system (O/S) and an application program. In detail, when the electronic apparatus 100 boots, the O/S may be stored in the RAM 211 and various application data items selected by the user may be stored in the RAM 211.

The ROM 212 may store a command set for system booting, and so on. When a turn-on command is input to supply power, the main CPU 214 may copy the O/S stored in the storage 2600 to the RAM 211 and execute the O/S to boot a system according to the command stored in the ROM 212. When booting is completed, the main CPU 214 may copy various application programs stored in the storage 2600 to the RAM 211 and execute the application program copied to the RAM 211 to perform various operations.

The graphic processor 213 may generate an image containing various objects such as an item, an image, and a text using a calculator (not shown) and a renderer (not shown). Here, the calculator may be a component for calculating an attribute value such as a coordinate value, a shape, a size, and color for display of each object according to a layout of an image using a control command received from the detector 220. In addition, the renderer may be a component that generates images with various layouts containing an object based on the attribute value calculated by the calculator. An image generated by the renderer may be displayed in a display region of the display 200.

The main CPU 214 may access the storage 2600 and perform booting using the O/S stored in the storage 2600. In addition, the main CPU 214 may perform various operations using various programs, contents, and data items stored in the storage 2600.

The first to $n^{th}$ interfaces 215-1 to 215-$n$ may be connected to the aforementioned various components. One of the first to $n^{th}$ interfaces 215-1 to 215-$n$ may be a network interface connected to an external device through a network.

The storage 2600 may store various programs and data items required for an operation of the electronic apparatus 100. The storage 2600 may be embodied as a non-volatile memory, a volatile memory, a flash memory, a hard disk drive (HDD), a solid state drive (SSD), or the like. The storage 2600 may be accessed by the controller 210 and the controller 210 may read/record/correct/delete/update data.

In addition, the storage 2600 may store a program, data, and so on for configuration of various images to be displayed in a display region of the display 200.

Hereinafter, a configuration of software stored in the storage 2600 will be described with reference to FIG. 27.

Figure 27:
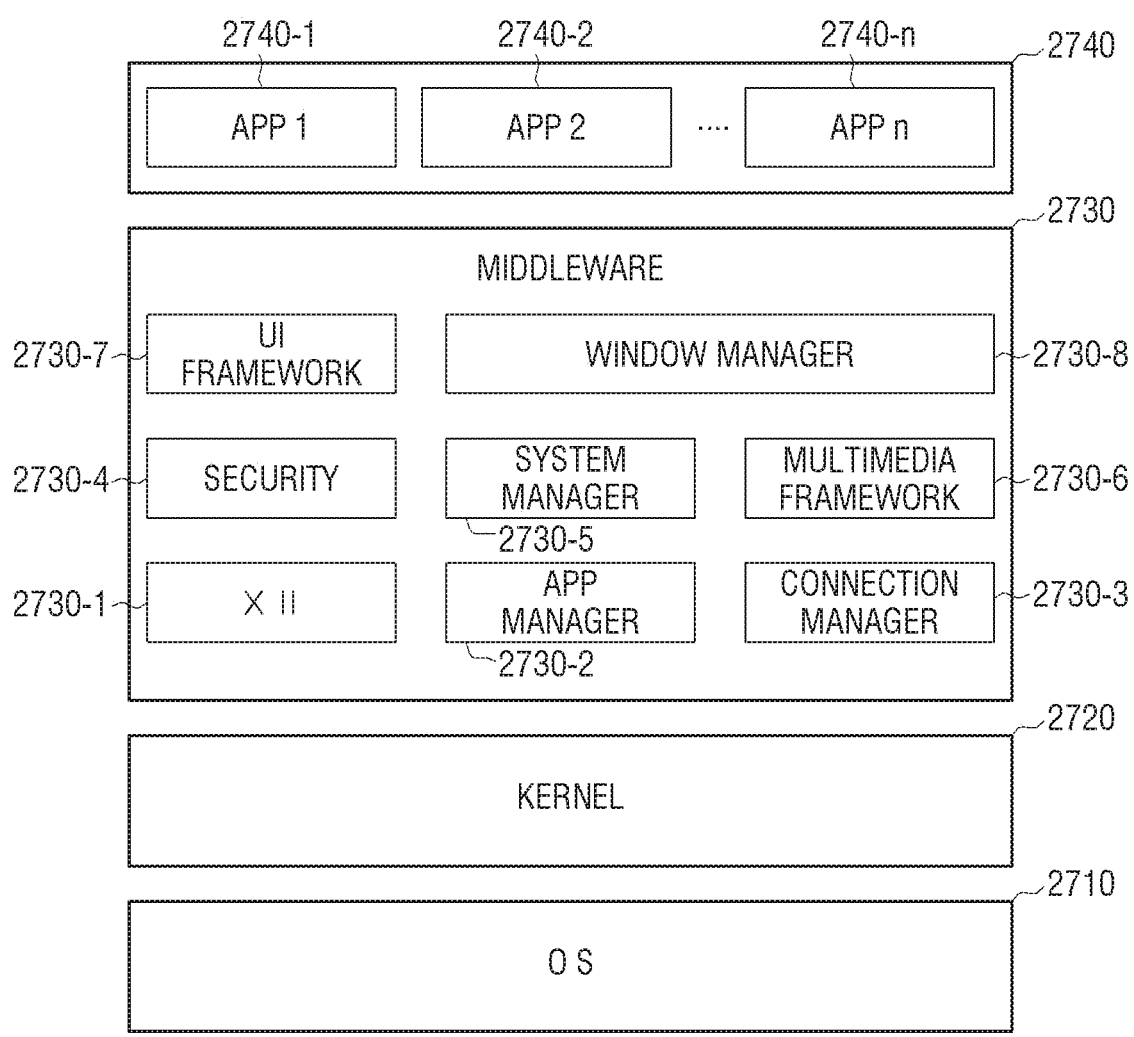
FIG. 27 is a schematic diagram of a configuration of software stored in a storage of an electronic apparatus according to an embodiment of the present disclosure.

FIG. 27 is a schematic diagram of a configuration of software stored in a storage of an electronic apparatus according to an embodiment of the present disclosure.

Referring to FIG. 27, the storage 2600 may store software containing an O/S 2710, a kernel 2720, middleware 2730, an application module 2740, and so on.

The O/S 2710 may control and manage an overall operation of hardware. That is, the O/S 2710 may be a layer that is in charge of a basic function of hardware management, memory, and security.

The kernel 2720 may function as a path for transmitting various signals including a touch signal detected by the detector 220 to the middleware 2730.

The middleware 2730 may include various software modules for control of an operation of the electronic apparatus 100. Referring to FIG. 27, the middleware 2730 may include an X11 module 2730-1, an application (APP) manager 2730-2, a connection manager 2730-3, a security module 2730-4, a system manager 2730-5, a multimedia framework 2730-6, a main UI framework 2730-7, and a window manager 2730-8. The middleware 2730 may include various other suitable software modules, such as a sub UI framework.

The X11 module 2730-1 may be a module for receiving various event signals from various hardware items installed in the electronic apparatus 100. Here, the event may be variously set to an event of detecting a user gesture, an event of occurrence of system alarm, an event of executing or terminating a specific program, and so on.

The APP manager 2730-2 may be a module for management of an execution state of various application modules 2740 installed in the storage 2600. In response to the application execution event being detected from the X11 module 2730-1, the APP manager 2730-2 may call and execute an application corresponding to the corresponding event.

The connection manager 2730-3 may be a module that supports wired or wireless network connection. The connection manager 2730-3 may include various subdivided modules such as a domain network (DNET) module and a universal plug and play (UPnP) module.

The security module 2730-4 may be a module that supports certification, permission, secure storage, and so on of hardware.

The system manager 2730-5 may monitor states of components in the electronic apparatus 100 and provide the monitoring result to other modules. For example, when battery remains are insufficient, errors occurs, or a communication connection state is disconnected, the system manager 2730-5 may provide the monitoring result to the main UI framework 2730-7 or the sub UI framework 2730-9 to output a notification message or a notification sound.

The multimedia framework 2730-6 may be a module for reproduction of multimedia content stored in the electronic apparatus 100 or provided from an external source. The multimedia framework 2730-6 may include a player module, a camcorder module, a sound processing module, and so on. Accordingly, various multimedia contents may be reproduced and images and sounds may be generated and reproduced.

The main UI framework 2730-7 may include an image compositor module for composing various UI elements, a coordinate compositor module for calculating a coordinate for display of a UI element, a rendering module for rendering the composited UI element on the calculated coordinate, and a 2D/3D UI tool kit for providing a tool for compositing a UI in the form of 2D or 3D.

The window manager 2730-8 may detect a touch event or other input events using a user body or a pen. In response to the event being detected, the window manager 2730-8 may transmit an event signal to the main UI framework 2730-7 and perform an operation corresponding to the event.

In addition, the electronic apparatus 100 may store various program modules such as a writing module for drawing a line along a drag trajectory when a user touches and drags an image or an angle calculating module for calculation of a pitch angle, a roll angle, a yaw angle based on a sensor value detected by the movement detector 222.

The application module 2740 may include applications 2740-1 to 2740-*n* for supporting various functions. For example, the application module 2740 may include a program module for providing various services, such as a navigation program module, a game module, an electronic book module, a calendar module, and an alarm management module. These applications may be installed as default and may be arbitrarily installed and used by a user during a use process. In response to a UI element being selected, the main CPU 214 may execute an application corresponding to an UI element selected using the application module 2740.

A software configuration illustrated in FIG. 27 is merely an example, but the embodiment of the present disclosure is not limited thereto. Accordingly, needless to say, according to a type or purpose of the electronic apparatus 100, some of components of the electronic apparatus 100 may be omitted or modified or other components may be added. For example, the storage 2600 may further include various programs such as a sensing module for analyzing signals sensed by various sensors, a messaging module such as a messenger program, a text message program, and an e-mail program, a call info aggregator program module, and a web browser module.

As described above, according to various embodiments of the present disclosure, issues of inputting and changing characters by the electronic apparatus 100 may be overcome.

In addition, speed of changing a character displayed on a display may be differently adjusted according to the characteristic of a touch drag signal such that a user easily changes and inputs a character according to a usage environment of an electronic apparatus.

The method of inputting and changing a character according to the aforementioned various embodiments of the present disclosure may be embodied as a program and provided to a display system.

For example, the method may include displaying a text input image and displaying a character displayed on the text input image to another character in response to arbitrary touch drag being detected, and a non-transitory computer readable medium for storing a program for differently adjusting character change speed may be provided.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact discs (CDs), digital versatile discs (DVDs), hard disks, Blu-ray disks, universal serial buses (USBs), memory cards, and ROM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a display;
a sensor; and
a processor configured to:
control the display to display a first character,
based on a change in a curvature of a drag input being detected by the sensor and a difference between a first distance and a second distance corresponding to the drag input, determine a speed of changing the first character to a second character,
control the display to change the first character to the second character at the determined speed,
reduce the seed of changing the first character to the second character in response to the drag input detected in a direction away from a predetermined point of the display, and
increase the seed of changing the first character to the second character in response to the drag input detected in a direction approaching the predetermined point of the display,
wherein the first distance is a distance between the predetermined point of the display and a starting point of the drag input, and the second distance is a distance between the predetermined point of the display and an end point of the drag input, the predetermined point of the display being different from the starting point of the drag input.

2. The electronic apparatus of claim 1, wherein the processor is further configured to differently adjust the speed of changing the first character to the second character in response to a change in a curvature of a trajectory of the drag input.

3. The electronic apparatus of claim 1, wherein the processor is further configured to differently adjust the speed of changing the first character to the second character in response to a region where the drag input is detected.

4. The electronic apparatus of claim 3, wherein the processor is further configured to:
increase the speed of changing the first character to the second character in response to the drag input detected in a first region of the display, and
reduce the speed of changing the first character to the second character in response to the drag input detected in a second region of the display.

5. The electronic apparatus of any one of claim 4, wherein the predetermined point is a central point of the display.

6. The electronic apparatus of claim 1, wherein the processor is further configured to select the first character in response to a position of the drag input is maintained for a predetermined time period.

7. The electronic apparatus of claim 1, wherein the processor is further configured to select the first character when the first character is changed in response to the drag input and then a direction of the drag input is changed to a direction of the predetermined point.

8. The electronic apparatus of claim 1, wherein the processor is further configured to select the first character when the first character is changed in response to the drag input and then another touch is inputted.

9. The electronic apparatus of claim 1, wherein the processor is further configured to:
control the display to display a character in response to a touch detected by the sensor,
change the first character to the second character in a first order in response to the drag input detected in a first direction, and
change the first character to the second character in a second order in response to the drag input detected a second direction.

10. The electronic apparatus of claim 1, further comprising:
band portions connected to opposite sides of the display,
wherein the display and the sensor constitute a touchscreen.

11. The electronic apparatus of claim 1, wherein the sensor comprises an independent touch pad separated from the display.

12. A method for inputting a text of an electronic apparatus, the method comprising:
displaying, by a processor, a first character on a display of the electronic apparatus;
based on a change in a curvature of a drag input being detected by a sensor and a difference between a first distance and a second distance corresponding to the drag input, determining, by the processor, a speed of changing the first character to a second character;
changing, by the processor, the first character to the second character at the determined speed,
reducing, by the processor, the speed of changing the first character to the second character in response to the drag input detected in a direction away from a predetermined point of the display; and
increasing, by the processor, the speed of changing the first character to the second character in response to the drag input detected in a direction approaching the predetermined point of the display,
wherein the first distance is a distance between the predetermined point of the display and a starting point of the drag input, and the second distance is a distance between the predetermined point of the display and an end point of the drag input, the predetermined point of the display being different from the starting point of the drag input.

13. The method of claim 12, further comprising differently adjusting, by the processor, the speed of changing the first character to the second character in response to a change in a curvature of a trajectory of the drag input.

14. The method of claim 12, further comprising differently adjusting, by the processor, the speed of changing the first character to the second character in response to a region where the drag input is detected.

15. The method of any one of claim 14, wherein the predetermined point is a central point of the display.

16. A non-transitory computer readable medium relating to a text input method of an electronic apparatus, the method comprising:
displaying, by a processor, a first character;
based on a change in a curvature of a drag input being detected by a sensor and a difference between a first distance and a second distance corresponding to the drag input, determining, by the processor, a speed of changing the first character to a second character;

changing, by the processor, the first character to a second character at the determined speed, reducing, by the processor, the speed of changing the first character to the second character in response to the drag input detected in a direction away from a predetermined point of a display; and increasing, by the processor, the speed of changing the first character to the second character in response to the drag input detected in a direction approaching the predetermined point of the display, wherein the first distance is a distance between the predetermined point of the display and a starting point of the drag input, and the second distance is a distance between the predetermined point of the display and an end point of the drag input, the predetermined point of the display being different from the starting point of the drag input.

\* \* \* \* \*